United States Patent [19]

Yoshida et al.

[11] Patent Number: 5,396,686
[45] Date of Patent: Mar. 14, 1995

[54] METHOD FOR AUTOMATICALLY TIGHTENING AND UNTIGHTENING A BOLT

[75] Inventors: Katsuhiko Yoshida, Takasago; Yoshinori Narahashi, Kakogawa; Yuji Nakajima; Kazuhiko Sakiyama, both of Kobe, all of Japan

[73] Assignee: Kabushiki Kaisha Kobe Seiko Sho, Kobe, Japan

[21] Appl. No.: 76,869

[22] Filed: Jun. 15, 1993

Related U.S. Application Data

[62] Division of Ser. No. 770,462, Oct. 3, 1991, Pat. No. 5,245,895.

[30] Foreign Application Priority Data

| Oct. 13, 1990 | [JP] | Japan | 02-274202 |
| Oct. 22, 1990 | [JP] | Japan | 02-110924 |
| Nov. 27, 1990 | [JP] | Japan | 02-125598 |
| Nov. 27, 1990 | [JP] | Japan | 02-125599 |
| Nov. 30, 1990 | [JP] | Japan | 02-338653 |
| Jun. 25, 1991 | [JP] | Japan | 03-153309 |

[51] Int. Cl.$^6$ ............................................. B23P 19/04
[52] U.S. Cl. ................................. 29/426.5; 29/430; 29/525.2; 29/781
[58] Field of Search .......... 29/34 B, 243.53, 243.55, 29/426.3, 426.5, 430, 431, 524.1, 525.1, 525.2, 781, 793, 794, 795, 240; 81/57.22, 57.24, 57.32, 57.36, 57.4

[56] References Cited

U.S. PATENT DOCUMENTS

| 1,493,396 | 5/1924 | Skolfield, Jr. | 29/243.55 |
| 3,858,731 | 1/1975 | Briggs | 29/781 |
| 4,967,472 | 11/1990 | Ebihara et al. | 29/525.2 X |
| 4,972,569 | 11/1990 | Aoki et al. | 29/430 X |

OTHER PUBLICATIONS

Patent Abstract of Japan, vol. 9, No. 316 Dec. 12, 1985; Document No. 60-150920, Aug. 1985.
"Automatic Tightening and Loosening Apparatus"; Document No. 60-150921, Aug. 1985, Tightening and Loosening Apparatus for Tightening Screws.
Patent Abstract of Japan, vol. 13, No. 528 Nov. 24 1989; Document No. 1-216806, Aug. 1989.

*Primary Examiner*—Peter Dungba Vo
*Attorney, Agent, or Firm*—Oblon, Spivak, McClelland, Maier, & Neustadt

[57] ABSTRACT

A method and apparatus for automatically tightening and untightening bolts which are assembling and fastening devices for a form used in centrifugal compacting and molding concrete products, in which engaging members are brought into engagement with rotary supports which support the form. A bolt tightening and untightening mechanism is moved with the rotary supports, and the bolts are automatically tightened and untightened during the movement thereof. Engaging members are operated more than a dimensional difference of the rotary supports so that even if dimensions of the rotary supports are different according to the kind of the form, the engaging members can be positively engaged with the rotary supports, or the bolt tightening and untightening mechanism is moved up and down in advance so that a height position thereof becomes a predetermined height with respect to the rotary supports.

3 Claims, 35 Drawing Sheets

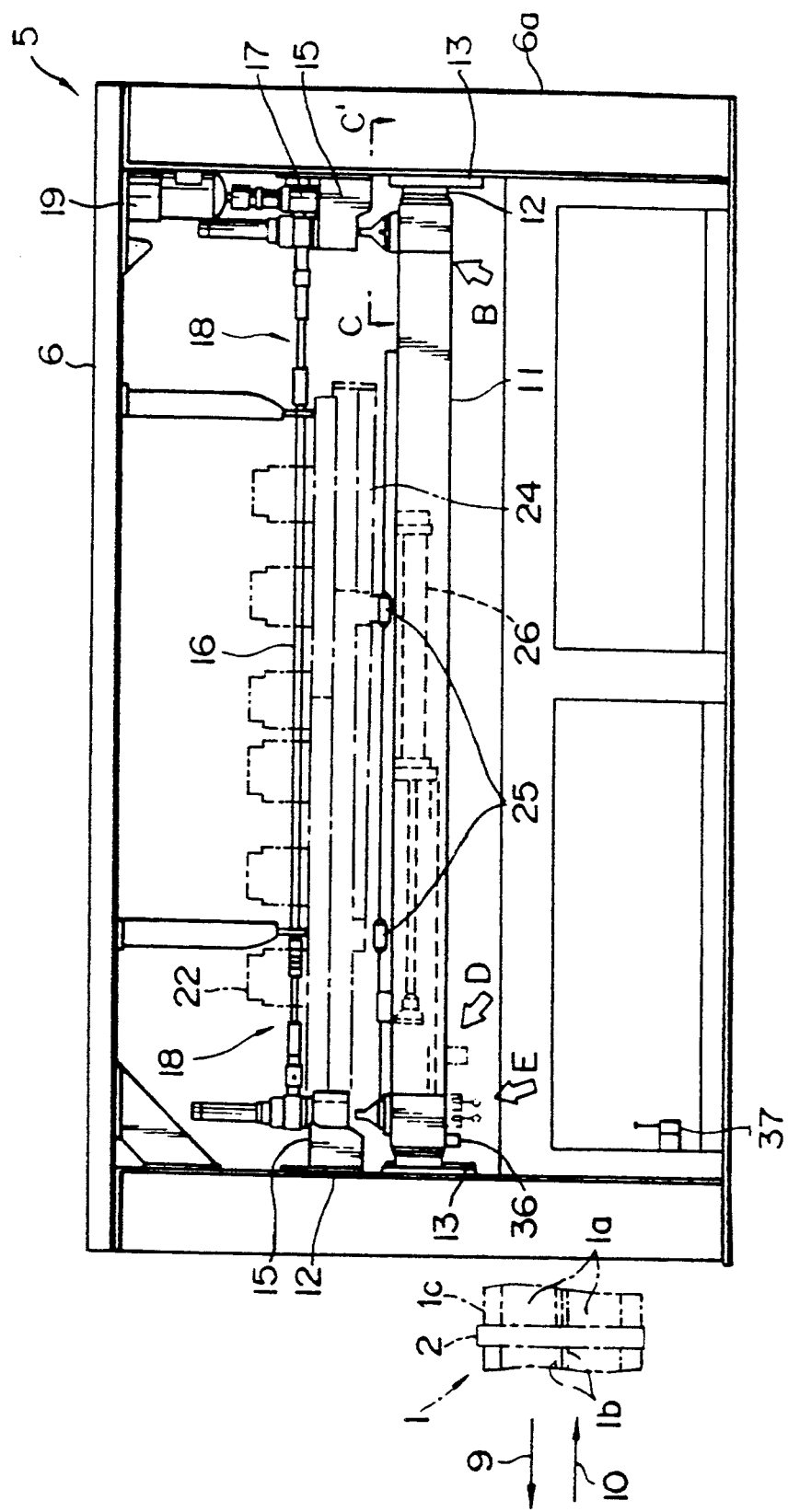

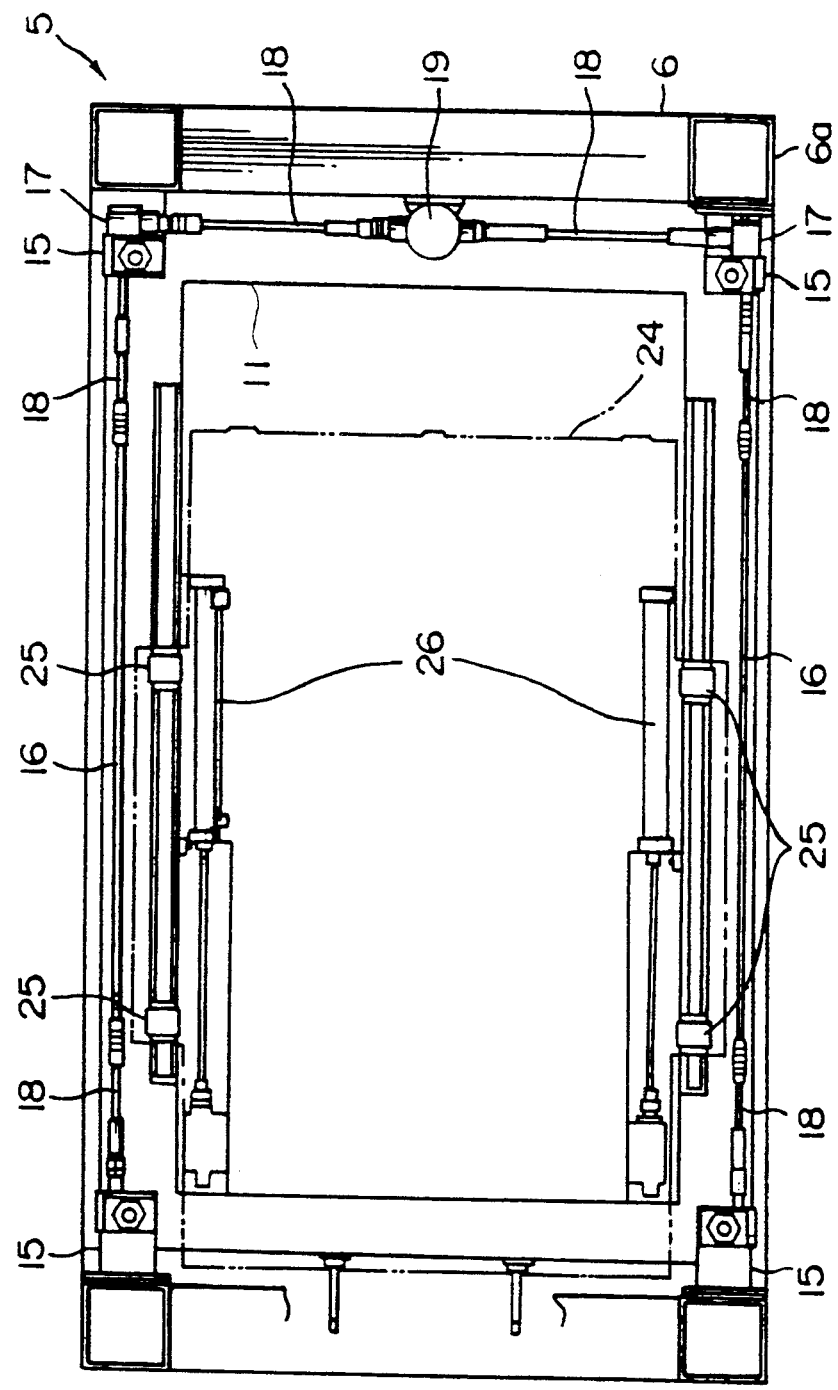

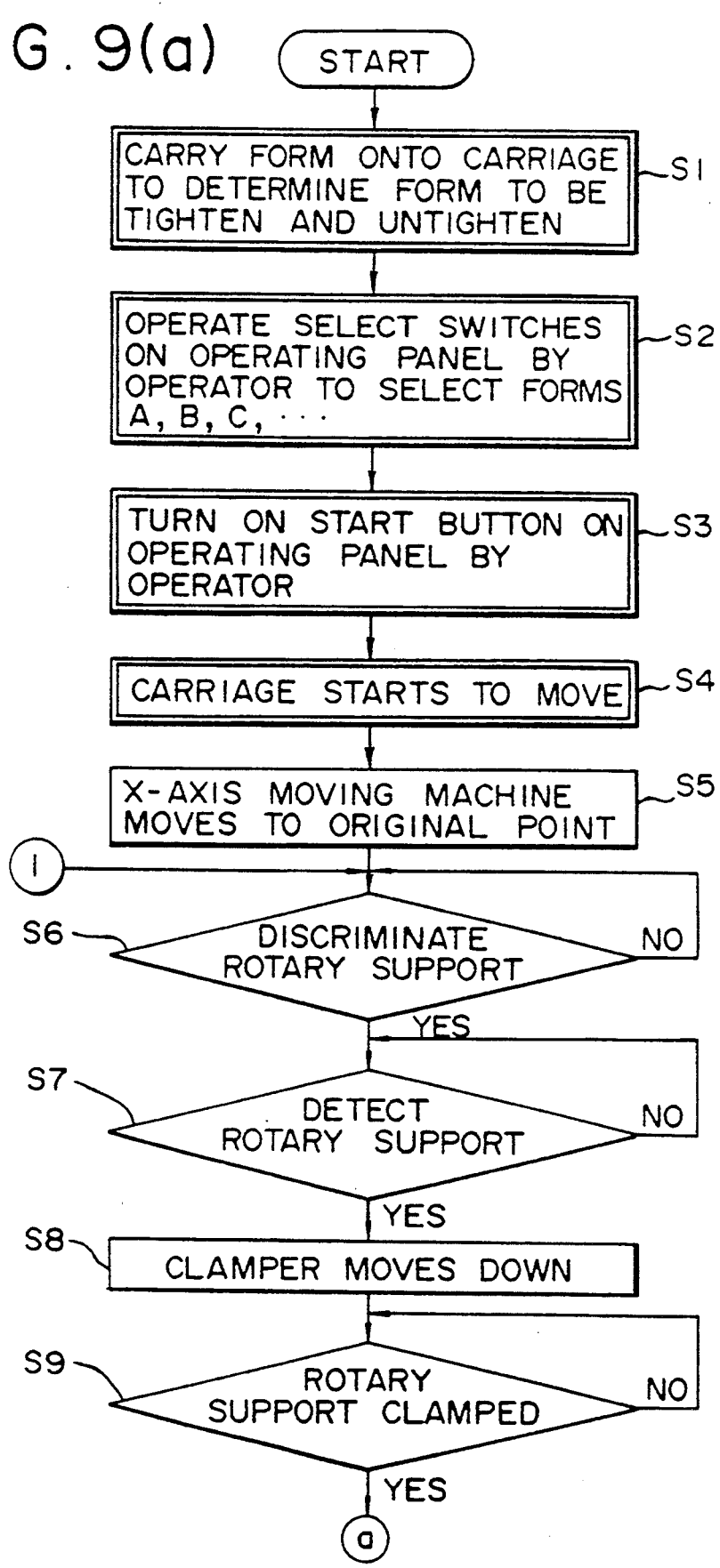

F I G. 10
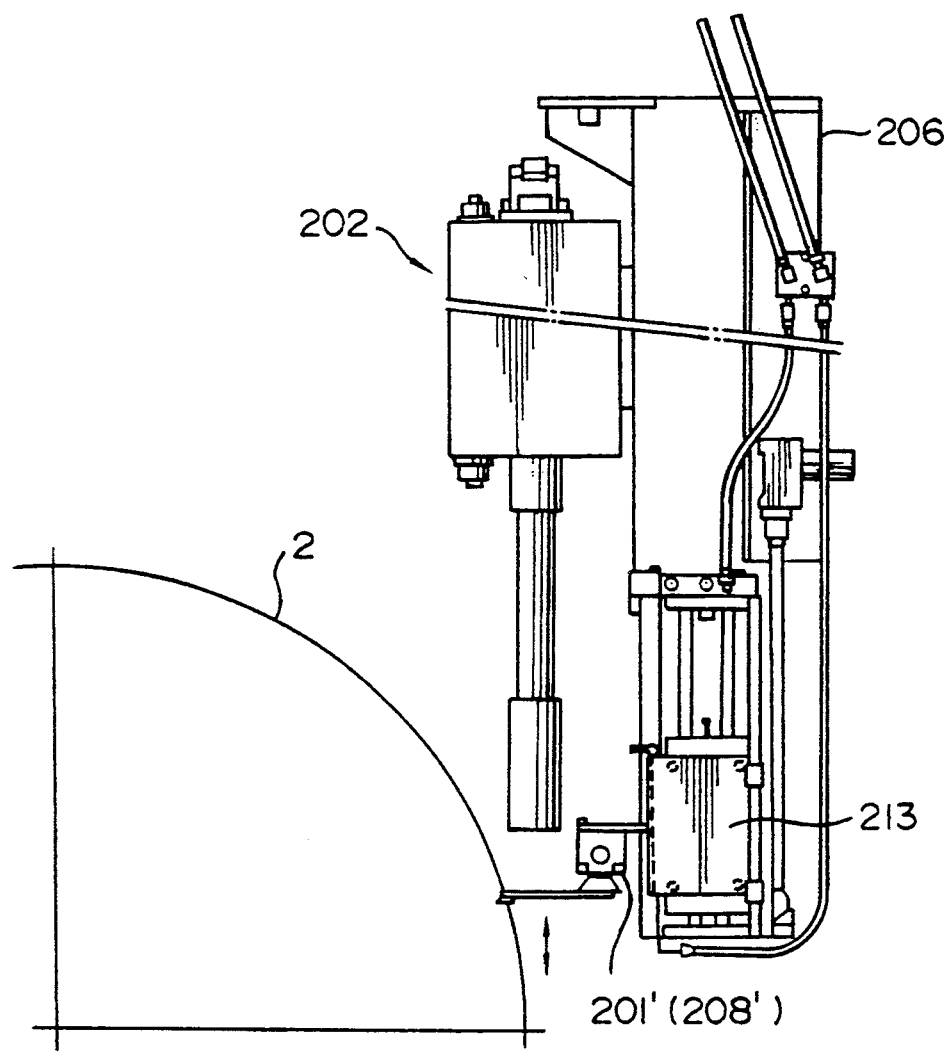

F I G. 16
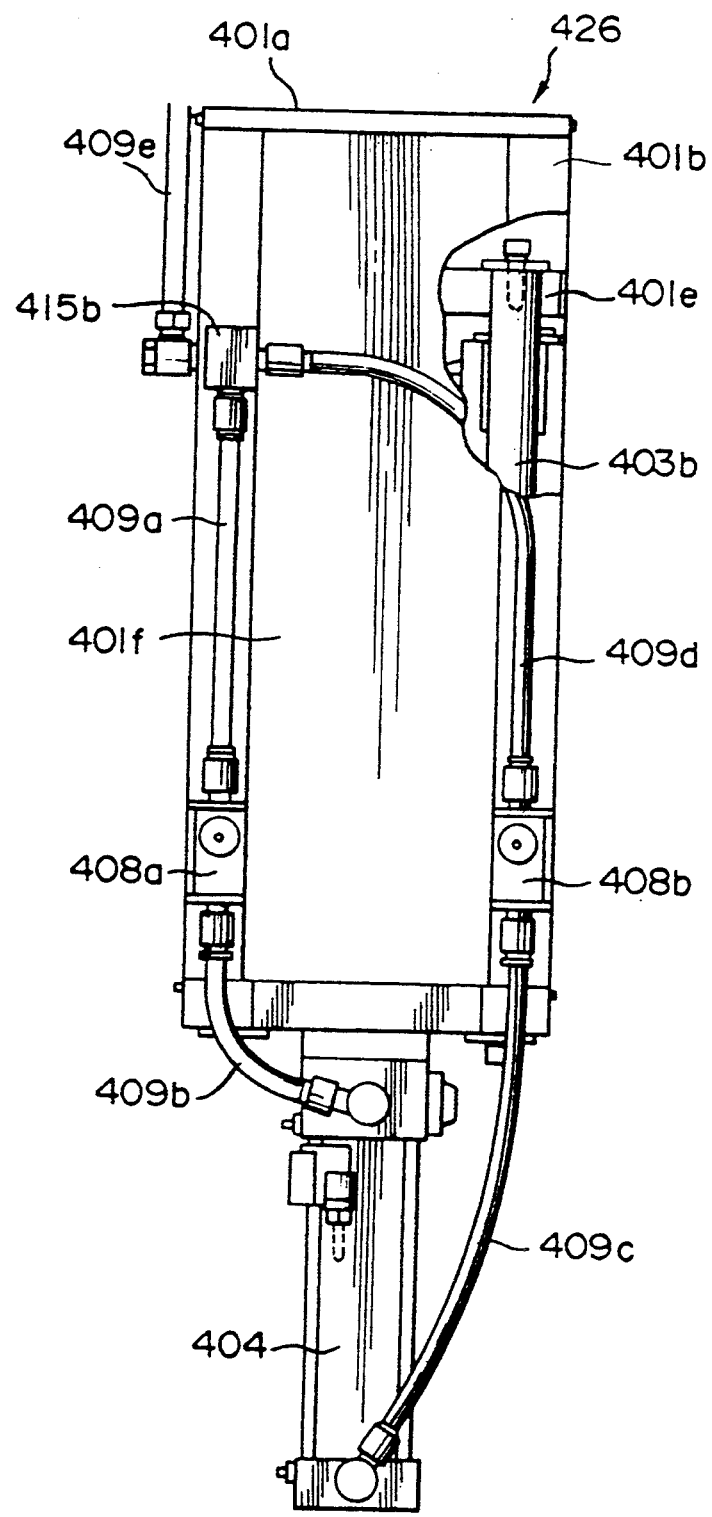

METHOD FOR AUTOMATICALLY TIGHTENING AND UNTIGHTENING A BOLT

This is a division of application Ser. No. 07/770,462, filed on Oct. 3, 1991 now U.S. Pat. No. 5,245,895.

BACKGROUND OF THE INVENTION

1. Field of the Invention

The present invention relates to a bolt automatic tightening and untightening method and apparatus therefor for automatically tightening and untightening a bolt/nut (a thread member) serving as an assembling and fastening device for a divisible form used in centrifugal compacting and molding of concrete products such as poles, piles, etc.

2. Description of the Prior Art

For example, as shown in FIGS. 24(a), 24(b) and 24(c), the aforementioned form 1 comprises two lengthy split forms 1a and 1a having a semicircular section, and each split form 1a has a reinforcing rib 1c axially projected substantially at a central portion of an outer peripheral surface thereof. Both the split forms 1a and 1a are formed into a cylindrical shape having a substantially round section by jointing respective flanges 1b projected from opposite ends of the split forms 1a and 1a to each other.

Disassembling or assembling of the form 1 is carried out by tightening and untightening plural sets of bolts 3 and nuts 4 provided at positions of flanges 1b spaced by a predetermined distance in an axial direction of the form 1 from a plurality of annular tires 2 (rotary supports) projected from the outer peripheral surface of the form 1 along the axis of the form 1.

The tires 2 are provided to rotatably support the form 1 when the form 1 filled with concrete is rotated to perform centrifugal compacting and molding of concrete products.

The apparatus for automatically tightening and untightening the bolt 3 is known, for example, from Japanese Patent Laid-Open No. hei 1-216806.

FIGS. 25 and 26 show a bolt automatic tightening and untightening apparatus disclosed in the aforementioned Japanese Patent. FIG. 25 is a front view, and FIG. 26 is a side view.

As shown in FIGS. 25 and 26, split forms 101a and 101b substantially similar to the split forms 1a and 1a of the aforementioned form 1 comprise lengthy semi-circular cylindrical bodies 101d and 101e, flanges 101c provided on semicircular opposite ends of the bodies 101d and 101e, and semicircular annular tires 102 axially projected from the outer peripheries of the bodies 101d and 101e. A form 101 comprises two flanges 101c jointed opposedly to each other, and a plurality of the tires 102 as strengthening members provided on the form 101 in an equal interval. Disassembling or assembling of the form 101 is carried out by tightening and untightening a number of bolts 103a and 103b provided on the flanges 101c. In FIG. 26, the phantom line X designates the center axis of the form 101.

In the bolt automatic tightening and untightening apparatus 104, a U-shaped frame 105 is provided so as to stride over a moving space of the form 101. The form 101 is placed on the upper surface of a carriage 106, which is in turn movable in a direction as indicated by arrows 119 and 120 on a set of rails 107.

A body 108 of a bolt tightening and untightening mechanism for automatically tightening and untightening bolts 103a and 103b of the form 101 is supported on the frame 105 in such a way as to be freely moved in the direction as indicated at the arrows 119 and 120 by means of a slide bearing 109, the body 108 being moved relative to the frame 105 by means of an air cylinder 110 provided on the frame 105.

In this bolt tightening and untightening mechanism, a plurality of tightening and untightening devices 111 composed of impact wrenches or the like are arranged on the body 108 in such a way that every two devices 111 are opposed to each other in order to tighten and untighten the bolts 103a on the flanges 101c projected from the split forms 101a and 101b. The two opposed tightening and untightening devices 111 can be moved in the form of one set in a direction as indicated at arrows 121 and 122 as well as up and down (in a direction of thread of bolt 103a). A socket 112 at the extreme end of the tightening and untightening device 111 can be replaced. On the body 108 of the bolt tightening and untightening mechanism, a clamper plate 116 is hung toward the form 101, so that the clamper plate 116 is engaged with the tire 102 provided on the outer peripheral surface of the form 101 whereby the body 108 of the bolt tightening and untightening mechanism can be moved on the rails 107 of the frame 105 as the form 101 moves.

The clamper plate 116 is mounted to be moved up and down by means of an air cylinder 117, and can be engaged with or disengaged from the tire 102.

The operation of the bolt automatic tightening and untightening apparatus will be described hereinafter.

When the form 101 is moved in the direction of the arrow 119 and the passage of the tire 102 of the form 101 is detected by a limit switch 118, the clamper plate 116 is moved down. When the form 101 is further moved in the direction of the arrow 119 and the tire 102 comes into engagement with the clamper plate 116, the form 101 in close contact with the body 108 moves in the direction of the arrow 119. The tightening and untightening device 111 is moved down during movement of the body 108 in the direction of the arrow 119, and the bolt 103a is tightened and untightened by the socket 112 of the tightening and untightening device 111.

Upon termination of the tightening and untightening operation of the bolt 103a, the tightening and untightening device 111 and the clamper plate 116 are moved upward to avoid contact with the tire 102, and the body 108 is moved in the direction of the arrow 120. Then, it engages a next rotary support to stand-by for operation of tightening and untightening the bolt 103b.

Naturally, a tires provided on the form are different in size, as well as the form, according to the kind of concrete products.

However, the conventional automatic tightening and untightening apparatus has a problem in that since a moving amount of the clamper plate engaged with the tire is preselected and constant, the moving amount of the clamper plate need be adjusted when the kind of the form is changed and its operation is extremely cumbersome for an operator.

SUMMARY OF THE INVENTION

It is therefore an object of the present invention to provide a tightening and untightening method and apparatus in which even if the size of a rotary support is changed according to the kind of a form, an engaging member can be positively engaged with the rotary support, without making any adjustment in movement of the engaging member, to automatically carry out tightening and untightening operation of bolts.

For achieving the aforementioned object, according to a first method for automatically tightening and untightening bolts, there is provided a bolt automatic tightening and untightening method, wherein bolts are provided at positions spaced by a predetermined distance in an axial direction of a divisible cylindrical form from annular rotary supports projected on the outer peripheral surface of the above form, engaging members provided on a bolt tightening and untightening mechanism relatively movable along with the above form with respect to an automatic tightening and untightening apparatus body at positions each corresponding to a distance between the above rotary support and the above bolt are actuated to engage with the above rotary supports, the above bolt tightening and untightening mechanism is relatively moved in response to the relative movement of the above form so as to tighten and untighten the above bolts by means of the above bolt tightening and untightening mechanism for assembling and disassembling the above form, and the above form is relatively moved with respect to the automatic tightening and untightening apparatus body so as to change an operating location of the bolt tightening and untightening mechanism in the above automatic tightening and untightening apparatus body, the improvement wherein the above engaging member is operated more than a dimensional difference between a plurality of rotary supports which are different in outside diameter according to the kind of the above form, and an operating amount of the above engaging member is defined by contact between the above engaging member and the above form.

According to a second method for automatically tightening and untightening a bolt of the present invention, there is provided a bolt automatic tightening and untightening method, wherein bolts are provided at positions spaced by a predetermined distance in an axial direction of a divisible cylindrical form from annular rotary supports projected on the outer peripheral surface of the above form, engaging members provided on a bolt tightening and untightening mechanism relatively movable along with the above form with respect to an automatic tightening and untightening apparatus body at positions each corresponding to a distance between the above rotary support and the above bolt are actuated to engage with the above rotary supports, the above bolt tightening and untightening mechanism is relatively moved in response to the relative movement of the above form so as to tighten and untighten the above bolts by means of tightening and untightening devices supported by the above bolt tightening and untightening mechanism which are moved up and down by the predetermined amount for assembling and disassembling the above form, the improvement wherein a distance from the above bolt tightening and untightening mechanism to a predetermined part of the above form is measured, and the above bolt tightening and untightening mechanism is relatively moved up and down with respect to the above form to be located in such a way that a distance from the above tightening and untightening device to the above bolt and a distance from the above engaging member to the above rotary support becomes a predetermined value prior to the tightening and untightening operation of the above bolts by the above tightening and untightening devices.

Furthermore, according to the present invention, there is provided a bolt automatic tightening and untightening apparatus, wherein bolts are provided at positions spaced by the predetermined distance in an axial direction of a divisible cylindrical form from annular rotary supports projected on the outer peripheral surface of the above form, engaging members provided on a bolt tightening and untightening mechanism relatively movable along with the above form with respect to an automatic tightening and untightening apparatus body at positions each corresponding to a distance between the above rotary support and the above bolt are actuated with a drive mechanism to engage with the above rotary supports, the above bolt tightening and untightening mechanism is relatively moved in response to the relative movement of the above form so as to tighten and untighten the above bolts by means of the above bolt tightening and untightening mechanism for assembling and disassembling the above form, and the above form is relatively moved with respect to the automatic tightening and untightening apparatus body so as to change an operating location of the bolt tightening and untightening mechanism in the above automatic tightening and untightening apparatus body, the improvement wherein the above drive mechanism comprises air cylinders having an allowable stroke amount for operating the above engaging members more than a dimensional difference of a plurality of rotary supports different in outside diameter according to the kind of the above form, and a roller for defining an operating amount of the above drive mechanism and the above engaging members by contact with the above form is provided on the above engaging members operated by the above drive mechanism for free rotation in an axial direction of the above form.

Accordingly, in the method and apparatus for automatically tightening and untightening a bolt according to the present invention, even if a size of the rotary support is changed for every kind of the form, the engaging member can be positively engaged with the rotary support to automatically carry out the tightening and untightening operation of bolts without any manual adjustment of the moving amount of the engaging member engaged with the rotary support.

Furthermore, in the second method for automatically tightening and untightening a bolt according to the present invention, there is an effect in that even if a support height position of the form is changed due to the wear of the rotary support, the bolts can be always automatically tightened and untightened in a stable state.

DESCRIPTION OF THE DRAWINGS

FIGS. 1(a)–1(f) shows a configuration of an apparatus for automatically tightening and untightening a bolt according to one embodiment of the present invention; FIG. 1(a) is a front view, FIG. 1(b) is a plan view, FIG. 1(c) is a right side view in FIG. 1(a), FIG. 1(d) is a rear view of a part taken at A of FIG. 1(c), FIG. 1(e) is a detailed view of a part taken at B, and FIG. 1(f) is a plan view of a part at C–C' of FIG. 1(a).

FIG. 2(a) is a front view, and FIG. 2(b) is a side view.

FIG. 3(a) is a front view, and FIG. 3(b) is a side view.

FIG. 8(a) is a front view, and FIG. 8(b) is a side view.

FIG. 10 is a front view showing essential parts of a bolt automatic tightening and untightening apparatus according another embodiment of the present invention.

FIG. 11(a) is a front view, and FIG. 11(b) is a side view.

FIGS. 14 to 17 show a tightening and untightening device according to a still another embodiment applicable to the bolt automatic tightening and untightening apparatus;

FIG. 14 is a front view, FIG. 15 is a right side view, FIG. 16 is a left side view, and FIG. 17 is a front view.

FIG. 18 is a front view, FIG. 19 is a side view, and FIG. 20 is a sectional view taken at H–H' of FIG. 18.

FIG. 21(a) is a front view, and FIG. 21(b) is a side view.

FIG. 23(a) is a front view, and FIG. 23(b) is a side view.

FIG. 24(a) is a front view, FIG. 24(b) is a side view taken at F in FIG. 24(a), and FIG. 24(c) is a detailed view taken at G in FIG. 24(b).

FIG. 25 is a front view, and FIG. 26 is a side view.

DETAILED DESCRIPTION OF THE PREFERRED EMBODIMENTS

Figure 1C:
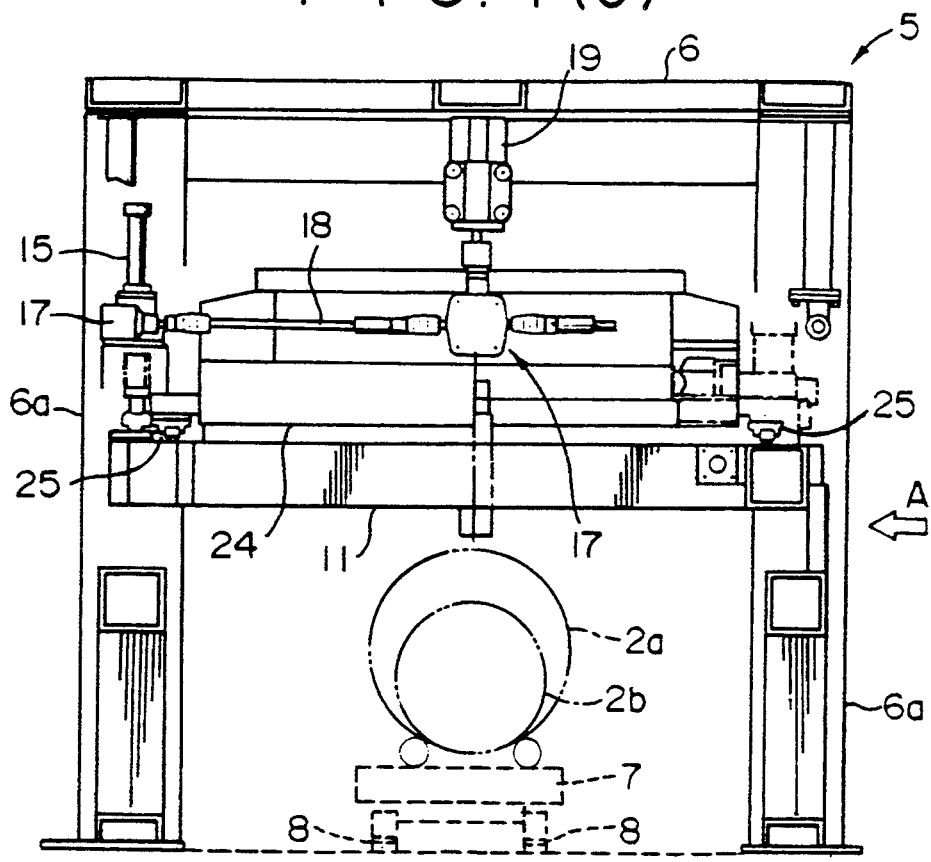
Figure 1D:
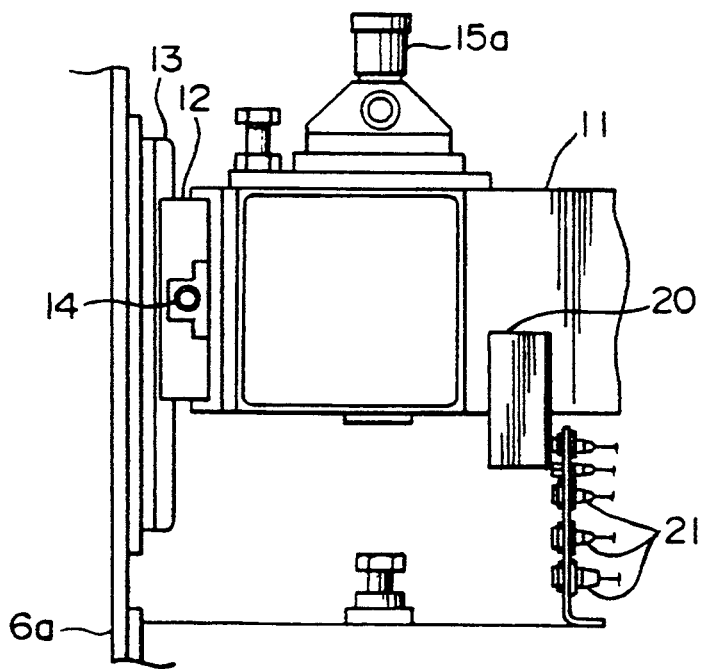
Figure 1E:
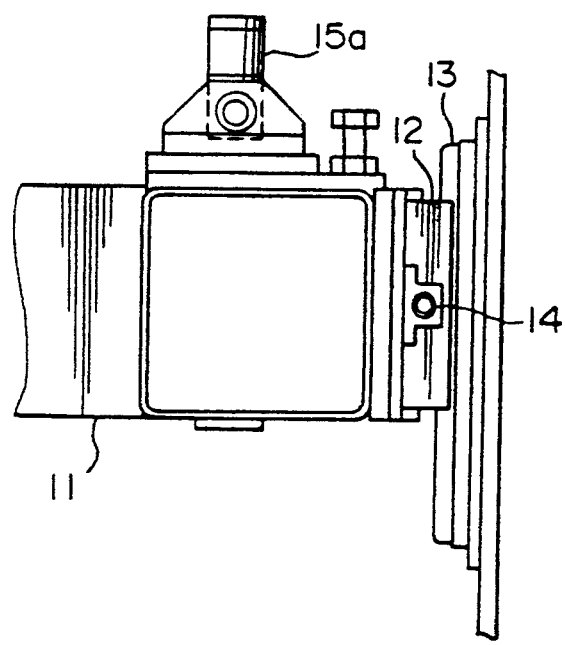
Figure 1F:
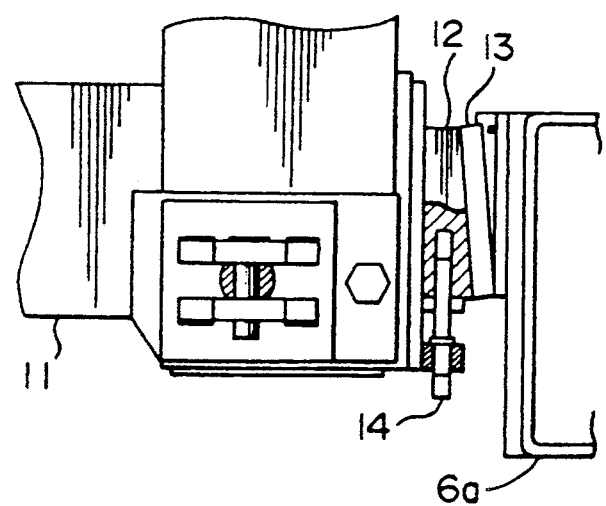

The present invention will be described hereinafter by way of exemplary embodiments with reference to the accompanying drawings for a understanding of the present invention. The following embodiments show one example in which the present invention is specified and are not of nature which limits the technical scope of the present invention.

As shown in FIGS. 1(a) to 1(f), FIG. 5 and FIGS. 24(a) to 24(c), a bolt automatic tightening and untightening apparatus 5 according to this embodiment is provided with a U-shaped frame 6 so as to stride over a moving space of a form 1. The form 1 is placed on the upper surface of a carriage 7, which is placed movably on a set of rails 8 and 8 in the direction of an arrow 9 or 10. An end of a chain (not shown), for example, is fitted on the carriage 7, and a sprocket mounted with the chain is rotated by a motor (not shown) so as to drive the carriage 7.

The frame 6 is provided with a lifter frame 11 therein, and an inclined surface of a guide 12 provided at each corner of the lifter frame 11 is placed in sliding contact with a plate-like guide receiving member 13 obliquely arranged on each leg 6a of the frame 6 so that the lifter frame 11 is supported movably up and down. In this case, the guide 12 is arranged adjustably in movement in a biting direction with respect to the guide receiving member 13, and a bolt 14 is rotated to adjust the biting amount of the guide 12 to thereby facilitate an adjustment of a clearance in a case where a sliding contact portion between the guide receiving member 13 and the guide 12 is worn, making it possible to always maintain a smooth sliding contact state while maintaining a so-called aligning effect of the lifter frame 11 with respect to the frame 6.

It is to be noted in this case that so-called linear bearings can be also used in place of the guide 12 and the guide receiving member 13.

An output shaft 15a of a jack 15 mounted on the leg 6a is connected to an upper surface portion of each corner of the lifter frame 11, the jack 15 being rotated and driven by a motor 19 through a shaft 16, a gear box 17 and a universal joint 18.

Each jack 15 is driven by the motor 19 whereby the lifter frame 11 is moved up and down with respect to the frame 6, and detection of the lifter position is carried out by detecting a striker 20 provided on the lifter frame 11 by means of a plurality of proximity switches 21 provided on the frame 6.

Figure 6A:
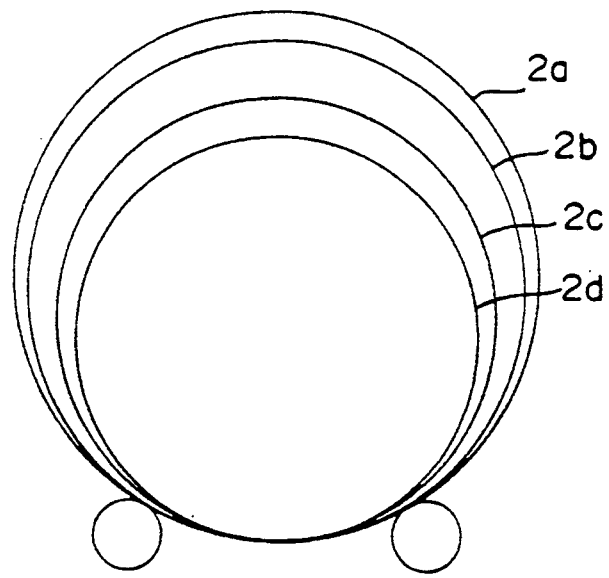
FIGS. 6(a) and 6(b) are respectively explanatory views showing the relative position relationship between the bolt automatic tightening and untightening apparatus and the tires when bolts of the forms are automatically tightened and untightened by the apparatus.
Figure 6B:
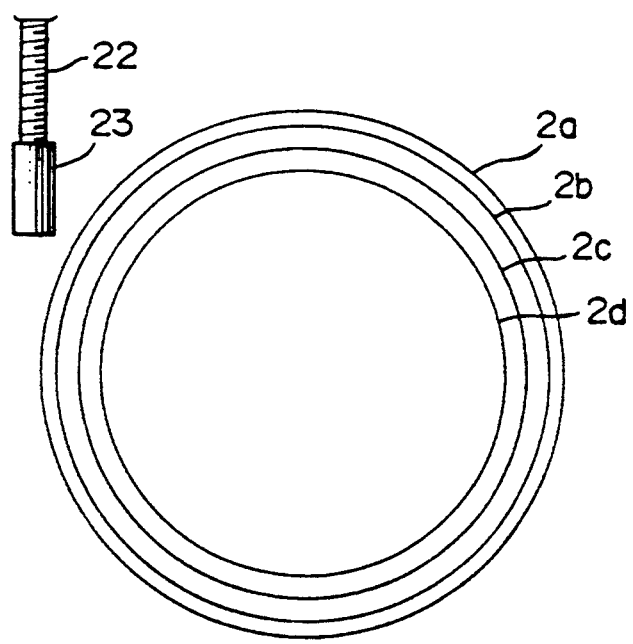

The plurality of the proximity switches 21 are arranged in the positional relationship considered so that the lifter frame 11 may be stopped at a position in which axes of a plurality of tires 2a to 2d (see FIGS. 6(a) and 6(b)) different in outside diameter according to various type of forms are apparently the same to each other so as to make substantially constant the distance between bolts provided on flanges of various type of forms and sockets 23 of tightening and untightening devices 22 such as impact wrenches, nut runners, etc. described later in carrying out automatic tightening and untightening operation of bolts.

Accordingly, the lifter frame 11 is moved up and down to a suitable position, prior to the automatic tightening and untightening operation of bolts, whereby the operation can be executed in a stabilized manner as if bolts in a single form are always automatically tightened and untightened.

In this case, a limit siwtch or a photoelectric switch can be also used in place of the aforementioned proximity switch 21. Further, in a case where the lifter position of the lifter frame 11 is desired to be set steplesswise, a potentiometer or an encoder may be used as a detector.

A body 24 of a bolt tightening and untightening mechanism for automatically tightening and untightening a bolt 3 of the form 1 is supported on the lifter frame 11 so that the body 24 may be moved in a direction of an arrow 9 or 10 by means of a slide bearing 25, and an air cylinder 26 is mounted on the body 24.

The air cylinder 26 has the function of applying resistance to the body 24 in an attempt of stabilizing the operation of the body 24 which moves as the form 1 moves and the function of returning the body 24 to an original position.

In the bolt tightening and untightening mechanism, for example, six tightening and untightening devices 22 are arranged on the body 24 in such a manner that every two devices 22 are opposed to each other, in order to simultaneously tighten and untighten six bolts 3 provided on opposite sides at a position spaced by the predetermined distance in the axial direction of the form 1 from the annular tire 2 projected on the outer peripheral surface of the form 1.

The tightening and untightening devices 22 are movably supported within a horizontal plane by means of an X and Y moving mechanism (not shown) provided on the body 24, and the devices 22 are moved to a position at which the bolt 3 corresponds to the socket 23 prior to the tightening and untightening operation of the bolts 3.

In this case, the moving amount of the tightening and untightening devices 2 is determined on the basis of dimensions of mounting spacing of the bolts 3 in an assembly drawing of the form 1.

After the locating of the tightening and untightening devices 22 in the horizontal plane has been made as described above, the socket 23 is moved up and down by an air cylinder 27 to automatically tighten and untighten the bolts 3.

Figure 2A:
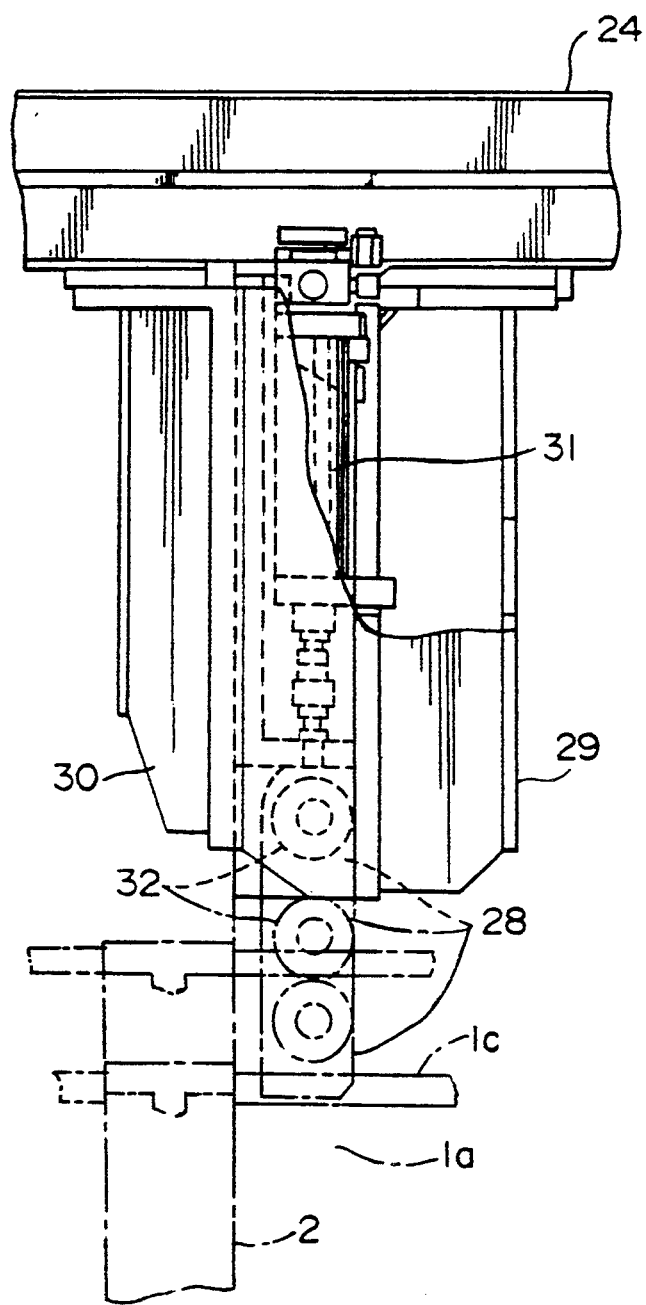
FIGS. 2(a)–2(b) are detailed view of a part taken at D in FIG. 1(a)
Figure 2B:
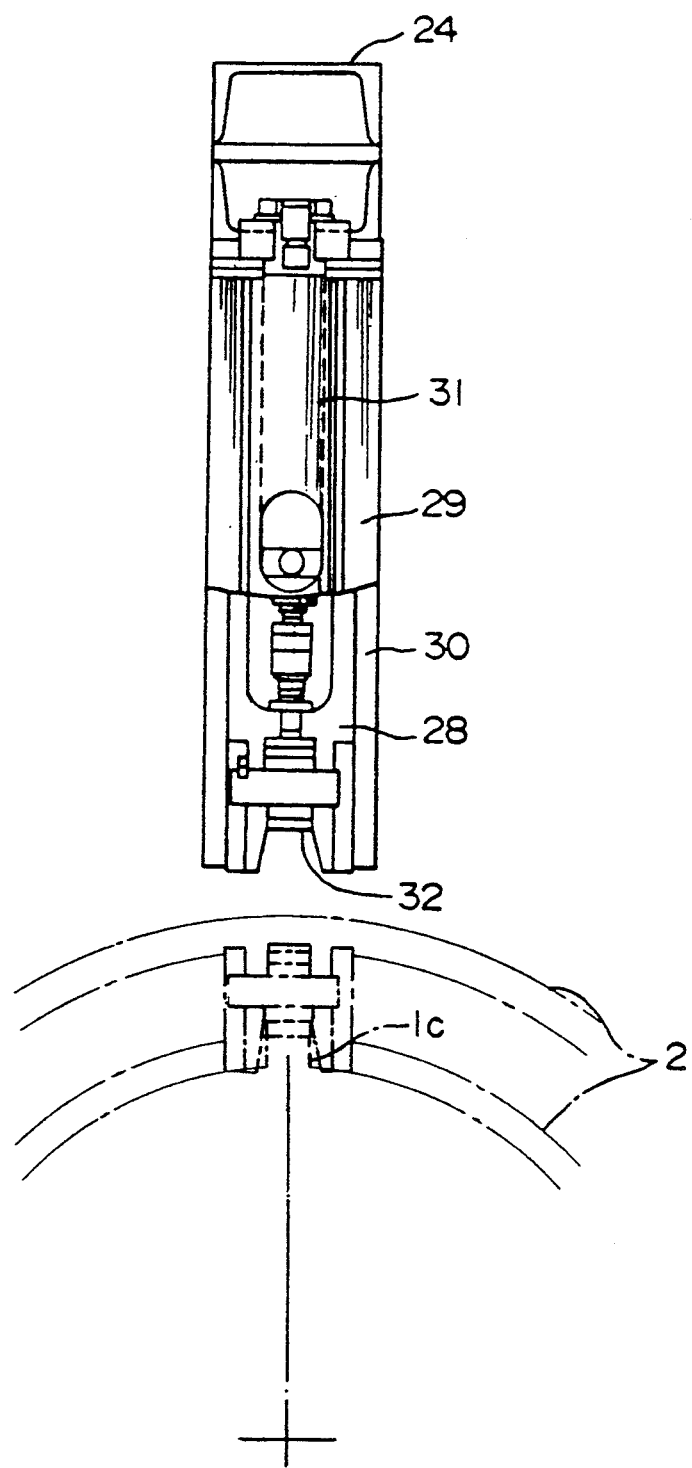

An engaging member 28 see FIGS. 2(a) and 2(b) is arranged at a position corresponding to the distance between the tire 2 and the bolt 3 from the tightening and untightening devices 22 on the lifter frame 11, the engaging member 28 being held vertically slidably by a holder 29 and a bracket 30.

The engaging member 28 is engaged with the tire 2 of the form 1 to move the body 24 of the bolt tightening and untightening mechanism as the form 1 moves, the engaging member 28 being moved up and down by an air cylinder 31 (a drive mechanism) so as to be engaged with or disengaged from the tire 2. The air cylinder 31 has an allowable stroke amount capable of operating the engaging member 28 more than a dimensional difference between a plurality of tires 2a to 2d different in outside diameter according to the kind of the form.

A roller 32 capable of being rotated in an axial direction of the form 1 is arranged at the extreme end of the engaging member 28, and the roller 32 is rolled in contact with the upper surface of a rib 1c provided along the axial direction of the form 1, when the engaging member 28 is moved toward the form 1 by the air cylinder 31, to define the operating amount of the air cylinder 31 and the engaging member 26.

Accordingly, in the apparatus of the present embodiment, even if the size of tires is changed for every kind of the form, the engaging member 28 can be positively engaged with the tire to automatically execute the tightening and untightening operation with respect to the bolts without requiring operator's manual adjustment of the moving amount of the engaging member 28 as in the case of the conventional apparatus.

Figure 3A:
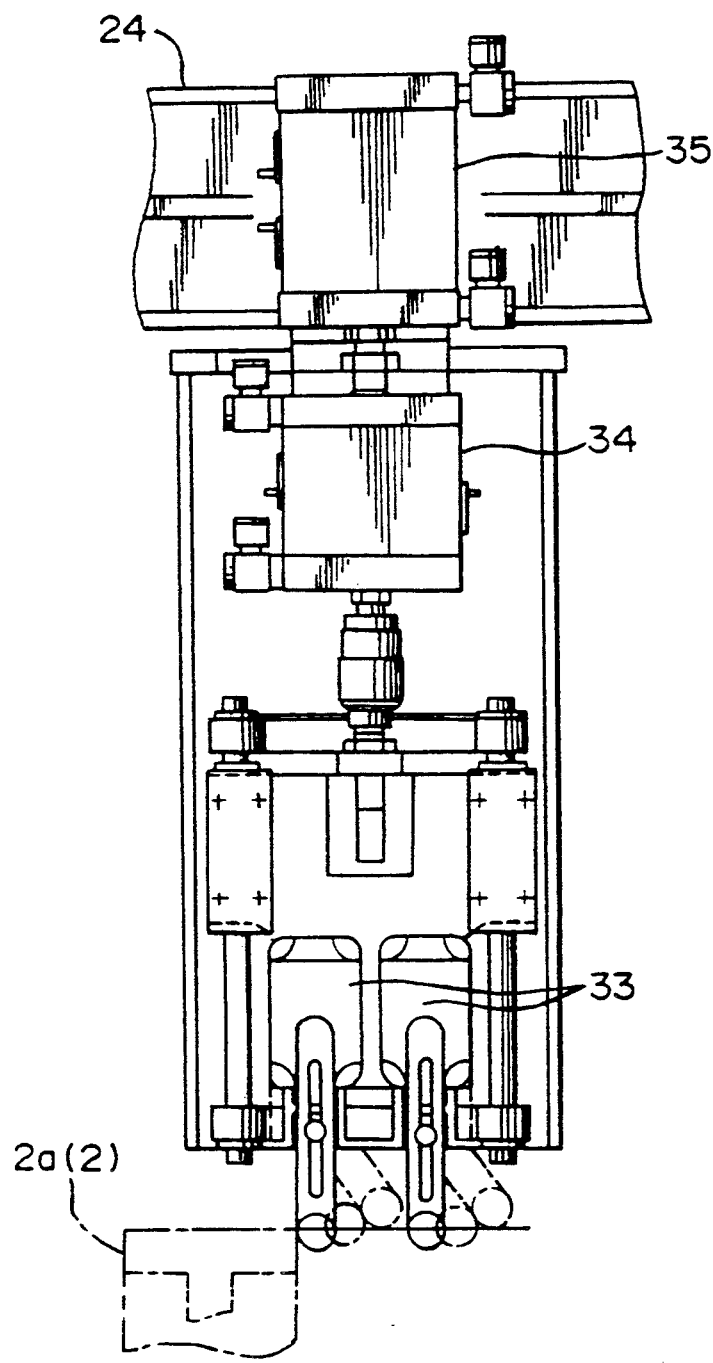
FIGS. 3(a)–3(b) are detailed views of a part taken at E in FIG. 1(a)
Figure 3B:
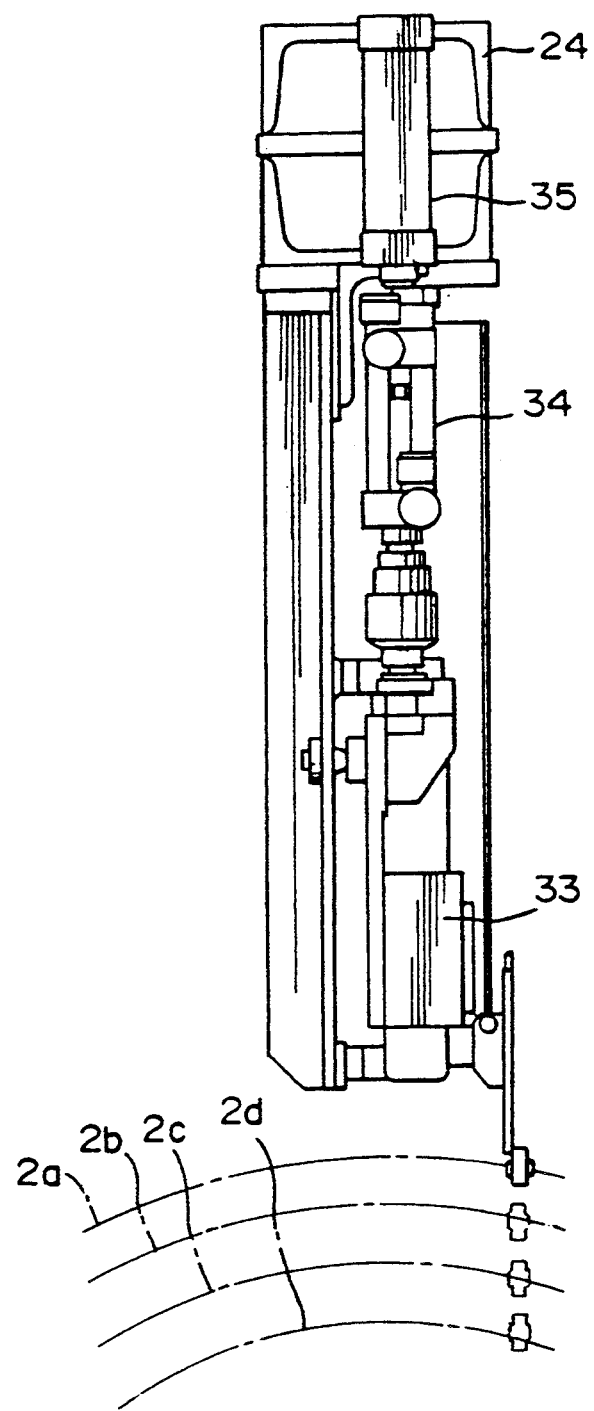

Timing for downwardly moving the engaging member 28 is at the time in which the tire 2 of the moving form 1 is detected by two limit switches 33 and 33 provided upstream in the moving direction of the form 1 of the engaging member 28 (see FIGS. 3(a) and 3(b)).

In this case, the limit switches 33 and 33 are moved up and down by two air cylinders 34 and 35 connected in series. The air cylinders 34 and 35 are suitably turned on and off to change the amount of downward movement of the limit switch 33 to enable positive detection of the passage of the plurality of tires 2a to 2d different in outside diameter.

The aforementioned air cylinders 34 and 35 can be applied to various tires by combining other air cylinders different in stroke amount to change the amount of upward and downward movement of the limit switch 33.

In this case, the passage of the tires 2 may be detected in a non-contact state by means of a reflective photoelectric tube or the like in place of a mechanism in which a plurality of air cylinders are combined to move up and down the limit switch 33 as described above.

Figure 4:
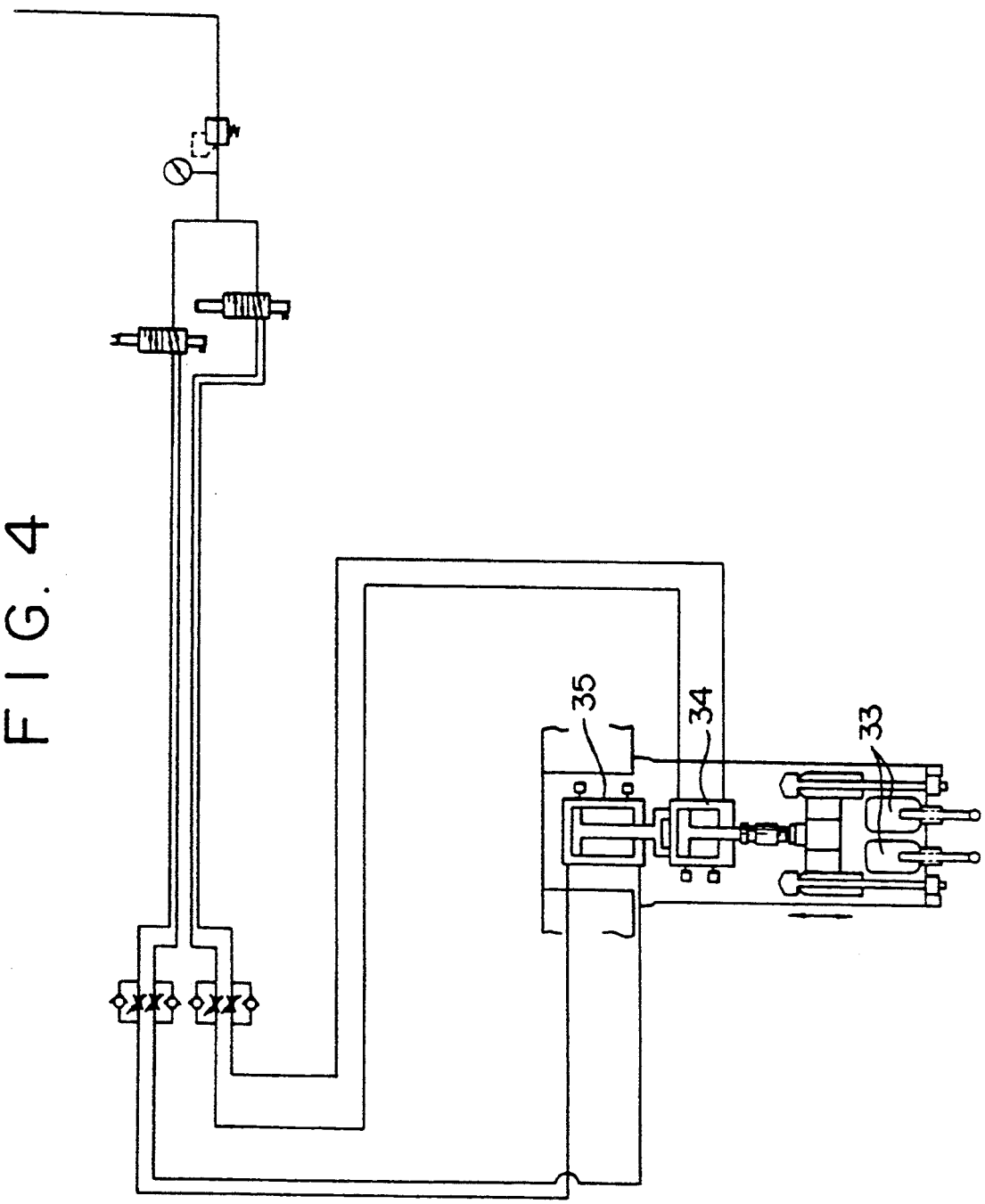
FIG. 4 is a circuit diagram of a drive system of a tire detection mechanism shown in FIG. 3.

For reference, FIG. 4 shows a circuit diagram of a drive system for the air cylinders 34 and 35 in the apparatus of the present embodiment.

The bolt automatic tightening and untightening apparatus 5 according to the present embodiment is configured as described above.

The operating procedure of the bolt automatic tightening and untightening apparatus 5 will be further described.

First, locating of the lifter frame 11 in a vertical direction is executed while adjusting to the size of the form 1 prior to the automatic tightening and untightening operation of bolts. Thereafter, the tightening and untightening devices 22 are moved to positions corresponding to the bolts 3 provided at a predetermined position with respect to the tires 2 of the form 1 by the X and Y moving mechanism (not shown).

Then, the air cylinder 26 is actuated to move the body 24 upstream in the moving direction of the form 1.

When the form 1 is moved and the passage of the tires 2 of the form 1 is detected by the limit switches 33 and 33, the engaging member 28 is moved down by the air cylinder 31.

In this case, the downward moving amount of the limit switches 33 and 33 is set in a predetermined value by suitably turning on and off the air cylinders 34 and 35 according to the outside diameter of the tires 2 of the form 1.

When the engaging member 28 is moved down as described above, the roller 32 of the engaging member 28 is rolled in contact with the rib 1c of the tire 2 according to the dimension of the outside diameter of the tire 2 to thereby define the operating amount of the engaging member 28. Thereafter, the form 1 is further moved and the tire 2 is engaged with the engaging member 28 whereby the body 24 of the bolt tightening and untightening mechanism moves along with the form 1. At this time, since the force of the engaging member 28 of the body 24 to press the tire 2 is controlled by the air cylinder 26, the engaging member 28 is not separated from the tire 2 but placed in close contact with the tire 2, and they move together in a stabilized state. Accordingly, the body 24 can positively follow the movement of the form 1.

The tightening and untightening devices 22 are moved down during the movement of the body 24, and the bolts 3 are tightened and untightened by the sockets 23 of the tightening and untightening devices 22.

Upon termination of the tightening and untightening operation of the bolts 3, the tightening and untightening devices 22 and the engaging member 28 are moved upward, and the body 24 is returned to its original position, and stands-by for the tightening and untightening opeation of bolts 3 provided at a predetermined position with respect to the next tire 2.

Accordingly, in the apparatus of the present embodiment, even if the size of tires is changed for every kind of form, the engaging member 28 can be positively engaged with the tires 2, without operator's manual adjustment of the moving amount of the engaging member 28 as in the case of the conventional apparatus, to automatically execute the tightening and untightening operation of bolts.

The apparatus of the present embodiment has been applied to the case where the form is moved by the carriage but it can be also applied to the case where the form is fixed and the apparatus is moved.

The bolt automatic tightening and untightening apparatus according to a further embodiment of the present invention will now be described.

The automatic tightening and untightening apparatus according to this embodiment is substantially similar in fundamental construction to the aforementioned described automatic tightening and untightening apparatus except that as shown in FIG. 1(a), a distance sensor 36 and a limit switch 37 are newly provided, and a function is added in which a distance of the form to a predetermined portion can be measured to locate the lifter frame 11 in advance at a predetermined height position.

More specifically, the distance sensor 36 is mounted on the lower surface side of the lifter frame 11 and at the end upstream side in the moving direction (direction indicated at an arrow 10) of the form 1. The distance sensor 36 is provided to measure the distance from the lifter frame 11 to the upper surface of the tire 2 in a non-contact manner. This measurement of distance is executed in synchronism with the detection of the passage of the tire 2 by the limit switch 37.

When the distance is measured by the distance sensor 36, the wear amount of the tire 2 is calculated, and the motor 19 is driven to vertically move the lifter frame 11 with respect to the form 1 and located so that the distance from the socket 23 of the tightening and untightening device 22 to the bolt 3 becomes a predetermined value (a lifter amount of the tightening and untightening device 22 determined in terms of mechanism), prior to the tightening and untightening operation of the tightening and untightening device 22 with respect to the bolts 3.

More specifically, let D be the relative distance (a known value on the premise that the tire 2 is not worn) from the lifter frame 11 in a pre-located state according to the kind of the form to the upper surface of the tire 2 and let (d) be the relative distance to the tire 2 measured by the distance sensor 36, the worn value of the tire 2 in connection with its diameter is represented by $AD = d - D$. The value $AD/2$ designates a changed value of the relative distance between the bolt 3 and the lifter frame 11 due to the wear of tire. Let (v) be the lifter speed of the lifter frame 11 caused by the motor 19, when the motor 19 is driven by a time (t) of $AD/2 \cdot V$ prior to the tightening and untightening operation of the bolts 3 to move the once located lifter frame 11, the relative distance between the bolts 3 and the sockets 3 of the tightening and untightening devices 22 can be set to a predetermined value.

Accordingly, in the apparatus of the present embodiment, by merely moving up and down the lifter frame 11 to a predetermined position preset for every form prior to the automatic tightening and untightening opeation of bolts, the tightening and untightening of bolts can be carried out automatically in a stabilized state always as automatic tightening and untightening of bolts in a single form is always carried out even if a support height position of the form 1 is changed due to the change in size of the tires 2 and the wear thereof. At the same time, the lifter amount of the clamper plate 28 can be made constant, and the engaging member 28 can be positively engaged with the tires 2 without requiring any manual adjustment of the moving amount of the engaging member 28 engaged with the tires 2.

In this case, a photoelectric switch or a proximity switch can also be used in place of the limit switch 37. As the distance sensor 36, an ultrasonic displacement meter is suitable in a case where the atmosphere at which the operation is carried out is taken into consideration.

Moreover, in this case, the distance to a flange $1b$ or the bolt 3 may be measured in place of measurement of the distance to the tires 2 by the distance sensor 36.

The operating procedure of the automatic tightening and untightening apparatus 5 will be described hereinafter.

First, vertical locating of the lifter frame 11 is executed while adjusting to the size of the form 1 prior to the automatic tightening and untightening operation of bolts. Thereafter, the tightening and untightening devices 22 are moved to positions corresponding to the bolts 3 provided at a predetermined position with respect to the tires 2 of the form 1 by the X and Y moving mechanism (not shown).

Then, the air cylinder 26 is actuated to move the body 24 upstream in the moving direction of the form 1.

When the form 1 is moved and the passage of the tire 2 is detected by the limit switch 37, the distance to the tires 2 is measured by the distance sensor 36, and the lifter frame 11 is further corrected to be moved so that the distance between the socket 23 of the tightening and untightening device 22 and the bolt 3 of the form 1 becomes a predetermined value.

Then, the passage of the tires 2 is detected by the limit switch 33, and after an elapse of a predetermined time, the engaging member 28 is moved down. When the engaging member 28 has been moved down as described above, the tire 2 is engaged with the clamper plate 28 whereby the body 24 of the bolt tightening and untightening mechanism moves along with the form 1.

The tightening and untightening devices 22 are moved down during the movement of the body 24, and the bolts 3 are tightened and untightened by the sockets 23 of the tightening and untightening devices 22.

Upon termination of the tightening and untightening operation of bolts 3, the tightening and untightening devices 22 and the clamper plate 28 are moved upward, and the body 24 is returned to its original position and stands-by for the tightening and untightening operation of the bolts 3 provided at a predetermined position with respect to the next tire 2.

In the present invention, it is to be noted that the lifter-frame 11 is directly moved up and down in such a way that the distance between the socket 23 of the tightening and untightening device 22 and the bolt 3 becomes a predetermined value by utilizing the result of distance measurement by the distance sensor 36 without locating the lifter frame 11 to a predetermined position in advance for every kind of form as in the aforementioned embodiments. Thus, the lifter frame 11 can be extremely efficiently located irrespective of the size of tires and its wear amount. Therefore, the aforementioned striker 20 and proximity switch 21 can be omitted.

A bolt automatic tightening and untightening apparatus according to a still another embodiment of the present invention will be described hereinafter.

Figure 7:
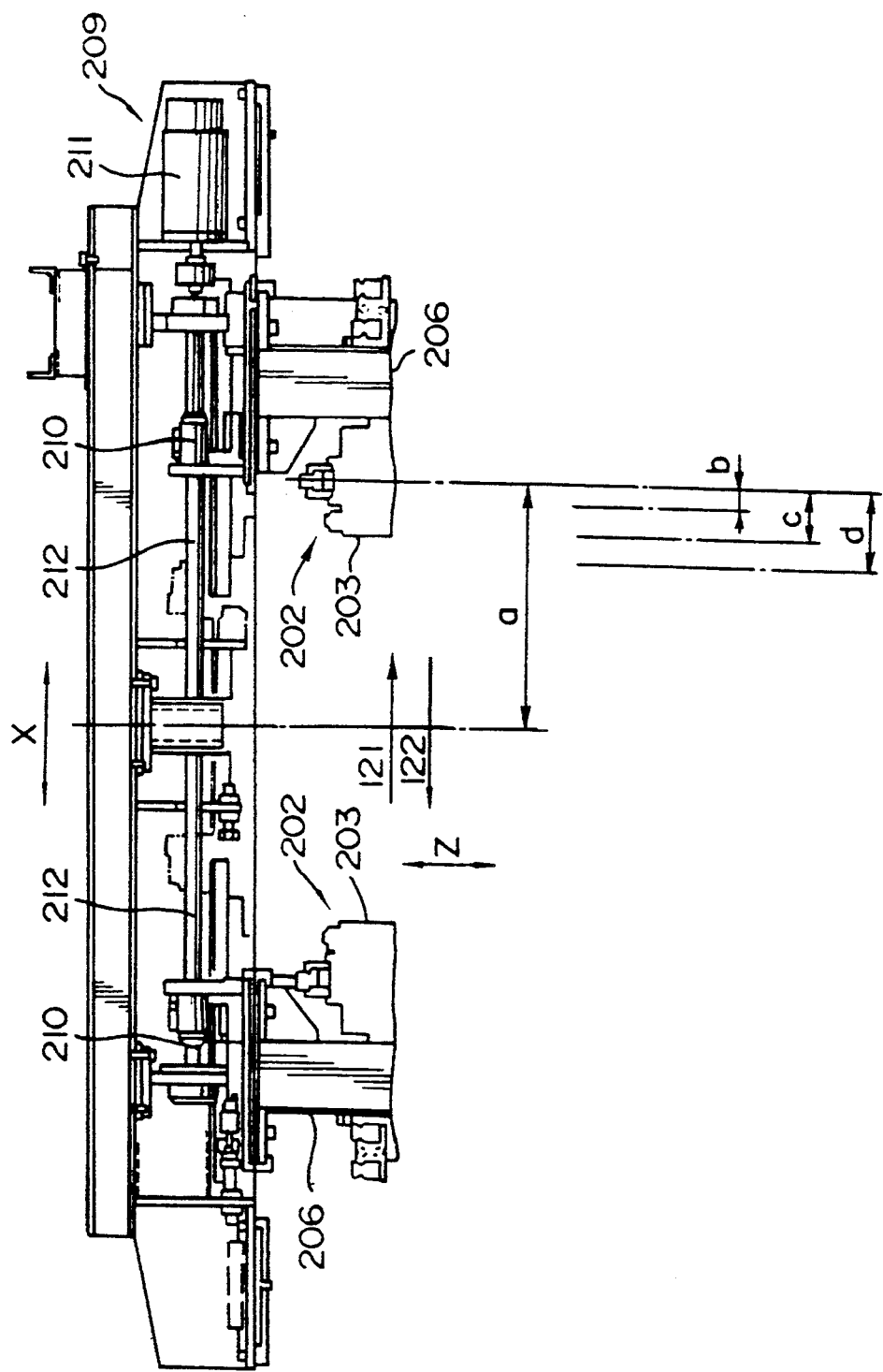
FIG. 7 is a front view showing essential parts of a bolt automatic tightening and untightening apparatus according to a further embodiment of the present invention.
Figure 8A:
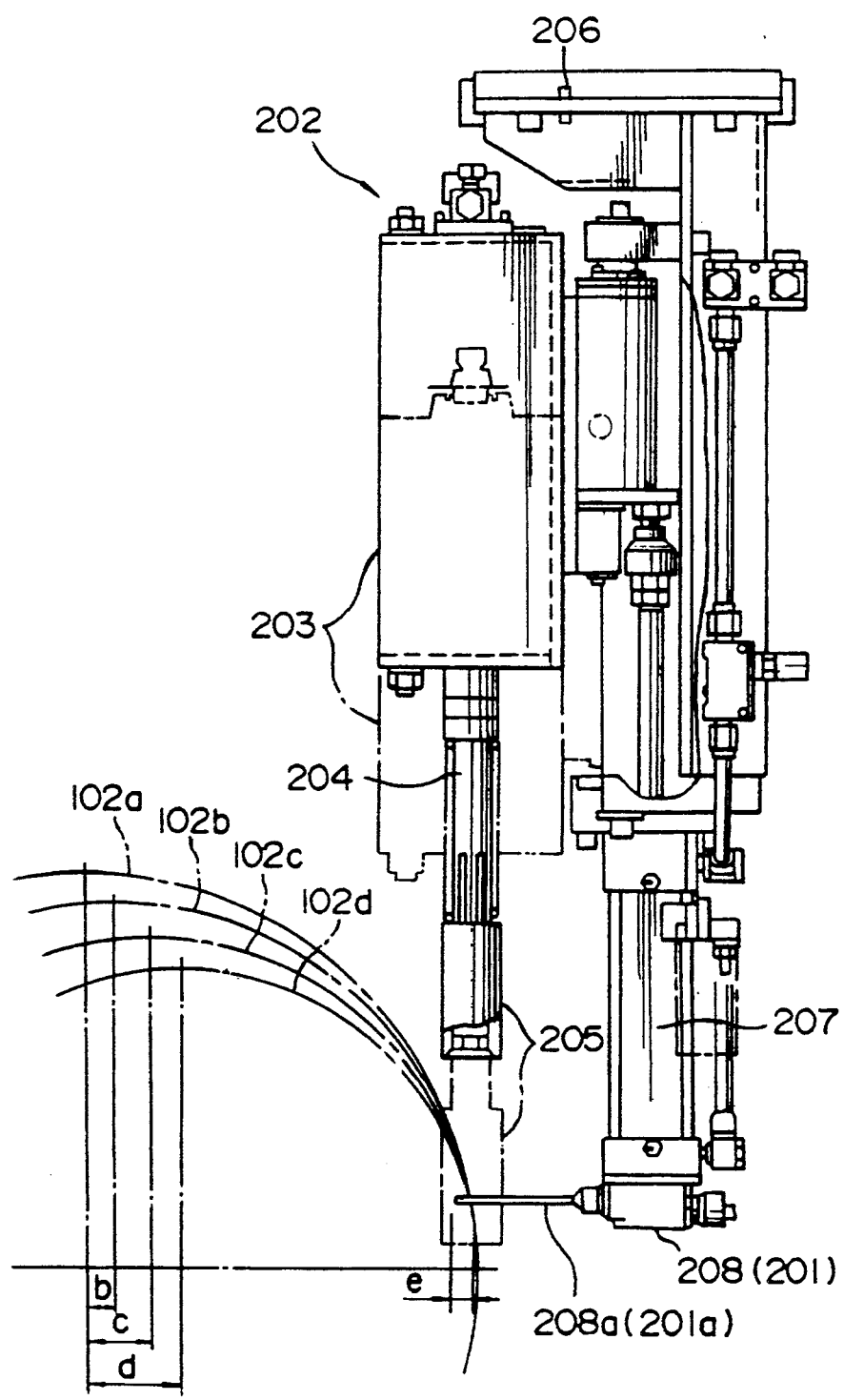
FIGS. 8(a)–8(b) show a configuration of a tightening and untightening device constituting the bolt automatic tightening and untightening apparatus.
Figure 8B:
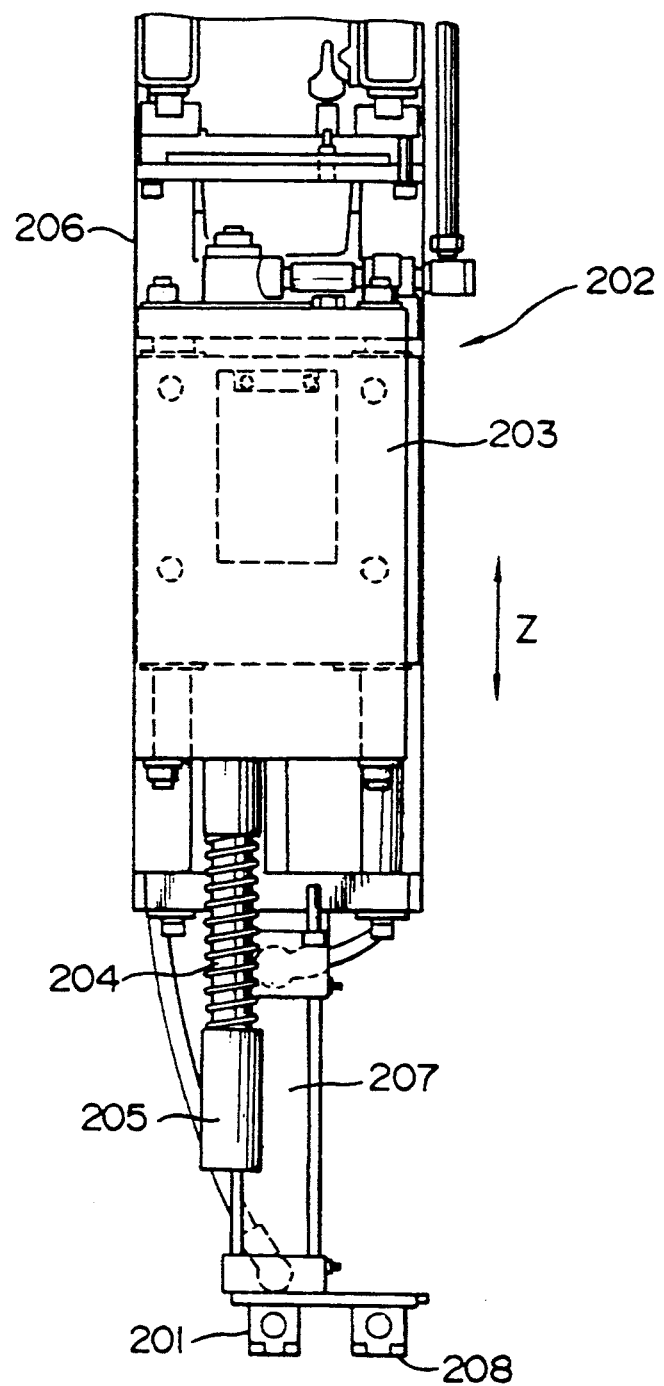

The bolt automatic tightening and untightening apparatus according to this embodiment is substantially similar in basic construction to the aforementioned bolt automatic tightening and untightening apparatuses except that as shown in FIG. 7 and FIGS. 8(a) and 8(b), for example, a contact type first limit switch 201 for detecting the relative passage of tires 102a to 102d of various type of forms is integrally arranged at a portion capable of being moved with a tightening and untightening device 202, and a position capable of detecting the tires 102a to 102d different in outside diameter according to the kind of the forms is set to an operating original position related to the X axis direction of the tightening and untightening device 202 with respect to the form.

More specifically, in the tightening and untightening device 202, a drive shaft 204 is projected from the lower surface side of a body 203, the drive shaft 204 being rotated by the action of air supplied from a compressed air source (not shown). For example, a socket 205 fitted into a bolt 103a of a form 101 for automatically tightening and untightening the bolt 103a is inserted into the extreme end of the drive shaft 204.

The body 203 is supported slidably in a vertical direction (in the Z axis direction) on a bracket 206 and is slidably driven by an air cylinder 207 mounted on the lower surface side of the bracket 206.

The first limit switch 201 is mounted on the lower end of the air cylinder 207, and further a contact type second limit switch 208 is provided adjacently to the first limit switch 201 in the axial direction of the form. The second limit switch 208, being positioned upstream from the relative moving direction of the form, detects the passage of the tire and during the outputting of the detected signal, the first limit switch 201 detects the passage of the same tire, so that the tire is judged as passing through a position opposed to the tightening and untightening device 202 without fail. For the reason as described above, the first limit switch 201 is called a tire detecting limit switch, and the second limit switch 208 is called as a tire descriminating limit switch.

In this case, a magnetic sensor, for example, may be used in place of the contact type limit switch as described above.

Accordingly, in the apparatus of this embodiment, the first limit switch 201 for detecting the passage of tires of various types of forms can be moved with the tightening and untightening device 202.

The aforementioned tightening and untightening devices 202 are mounted in place of the tightening and untightening devices 22, as shown in FIG. 1.

More specifically, the tightening and untightening device 202 is arranged on the body 24 (see FIG. 1), and a pair of brackets 206 and 206 are mounted on bases 210 and 210 of a moving mechanism 209 (see FIG. 7) for supporting the tightening and untightening device 202 movably in the X axis direction. The bases 210 and 210 are supported slidably in the X axis direction by means of slide bearings, and are mutually slidably moved in directions opposed to each other by bowl screws 212 and 212 rotated by a servomotor 211.

In the present apparatus, a position capable of detecting the passage of tires of various type of forms by the first and second limit switches 201 and 202 is set to be an operating original position in the X axis direction of the tightening and untightening device 202 with respect to the form.

More specifically, the original position is set at distances (a), (b), (c) and (d) according to the tires so that a lap allowance between respective detection levers 201a and 208a of the first and second limit switches 201 and 208 and, for example, the tires 102a to 102d of various is constant.

The operation of the bolt automatic tightening and untightening apparatus will be described hereinafter with reference to FIG. 9.

The operation in which the body 24 of the bolt tightening and untightening mechanism is moved with the form is similar to the case of the aforementioned apparatuses, and therefore, detailed description thereof will be omitted. The operation of the tightening and untightening device 202 which forms a characteristic portion of the apparatus of the present embodiment will be mainly described hereinbelow.

Figure 9B:
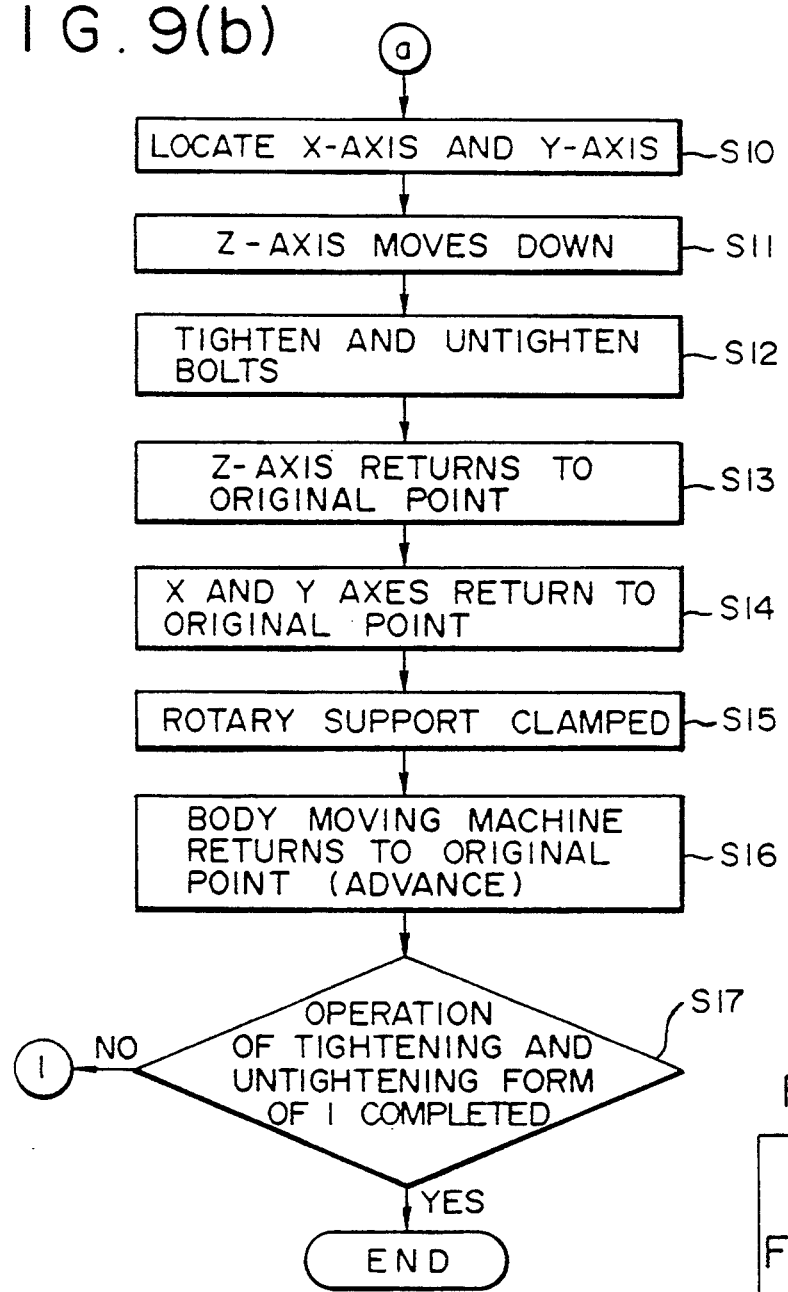
FIG. 9 comprises FIGS. 9(a) and 9(b) each show a flow chart showing the operating procedure of the bolt automatic tightening and untightening apparatus.
Figure 9:
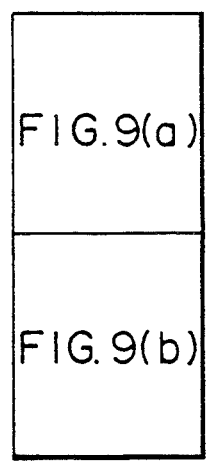

In FIG. 9, S1, S2, ... denote the steps of operations. First, for example, the form 1 (see FIG. 5) is placed on the carriage 7 to decide the kind of the form to be tightened and untightened (S1). Next, at step S2, the kind of the form is selected by a select switch on an operating board (not shown) by an operator, and a start button is turned ON (S3).

Then, the carriage 7 starts to be moved toward the frame 6 (S4).

At the same time, the tightening and untightening device 202 is moved in connection with the X axis direction toward the original position according to the dimension of outside diameter of the tire 2 of the form 1 and located at the original position (S5). In this located state, the lap allowance (e) between respective limit switches 201a and 208a of the first and second limit switches 201 and 208 and the tire 102 will result.

In this state, the carriage 7 is further moved, and the passage of the tire 2 is detected by the second limit switch 208. When the passage of the tire 2 is detected by the first limit switch 201 (S7) in the state in which the detection signal is outputted (S6), the engaging member 28 is moved down (S8).

The form 1 is further moved by the carriage 7 so that the tire 2 is engaged with the engaging member 28 (S9), whereby the form 1 is moved in the state in which the form is in close contact with the body 24.

Locating of each set of tightening and untightening devices 202 in the X axis direction is carried out during the movement of the body 24 (S10), and the body 203 of the tightening and untightening device 202 is moved down (S11).

Then, the socket 205 of the tightening and untightening device 20 is fitted into the bolt, and the socket 205 is rotated whereby the bolt is tightenend and untightened (S12).

Thereafter, the body 203 is moved up (S13), and the tightening and untightening device 202 is returned to the original position (S14). Upon termination of the tightening and untightening operation with respect to the bolt as described above, the clamper plate 28 is moved upward in order to avoid the contact with the tire 2 (S15), and the body 24 returns to the original position (S16) and engages with the next tire 2 to stand-by for the tightening and untightening operation of bolts.

Judgement is made so that all the tightening and untightening operation with respect to the bolts of the form 1 has been terminated (S17), whereby the tightening and untightening operation by the apparatus is terminated.

It is of course that the apparatus of the present invention has the effects as obtained by the aforementioned apparatuses. In addition, since the first and second limit switches 201 and 208 move to the position capable of detecting the passage of the tire 2 by the first and second limit switches 201 and 208 with the tightening and untightening devices 202, an exclusive-use lifter mechanism or the like used to locate the limit switches is not required. Furthermore, since the tightening and untightening device 202 is operated with the position moved as described above taken as the original position with respect to the form, the operation is executed with the shortest distance most suitable for the form taken as the range of operation, and thus the efficiency of operation is rapidly improved.

Although it cannot be denied that this embodiment becomes somewhat complicated in construction as compared with the case of the above-described embodiments, it is to be noted that for example, as shown in FIG. 10, first and second limit switches 201' (208') are supported vertically movably on the bracket 206 which moves along with the tightening and untightening device 202 to thereby avoid an inconvenience that when the body 24 is relatively moved with respect to the form 1 during the continuous tightening and untightening operation of bolts, respective detection levers of the first and second limit switches 201' (208') are placed in contact with the tires 2 in a shocked manner. In this case, since the limit switches 201' (208') will suffice to be able to move upward to a degree that may avoid the contact with the tires 2, the stroke amount of the linear type air cylinder 213 for moving the limit switches 201' (208') will suffice to be short and can be disposed in a compact manner.

That is, in the apparatus of the present embodiment, locating of a limit switch for detecting a tire when the kind of the form is changed can be made with an extremely simple and inexpensive configuration without using an exclusive-use lifter mechanism or the like as means for locating a limit switch. In addition, the apparatus can be operated according to the size of the form and an improvement in the operating efficiency can be achieved as well.

The tightening and untightening device according to another embodiment applicable to the aforementioned bolt automatic tightening and untightening apparatuses will be described hereinbelow.

Figure 11A:
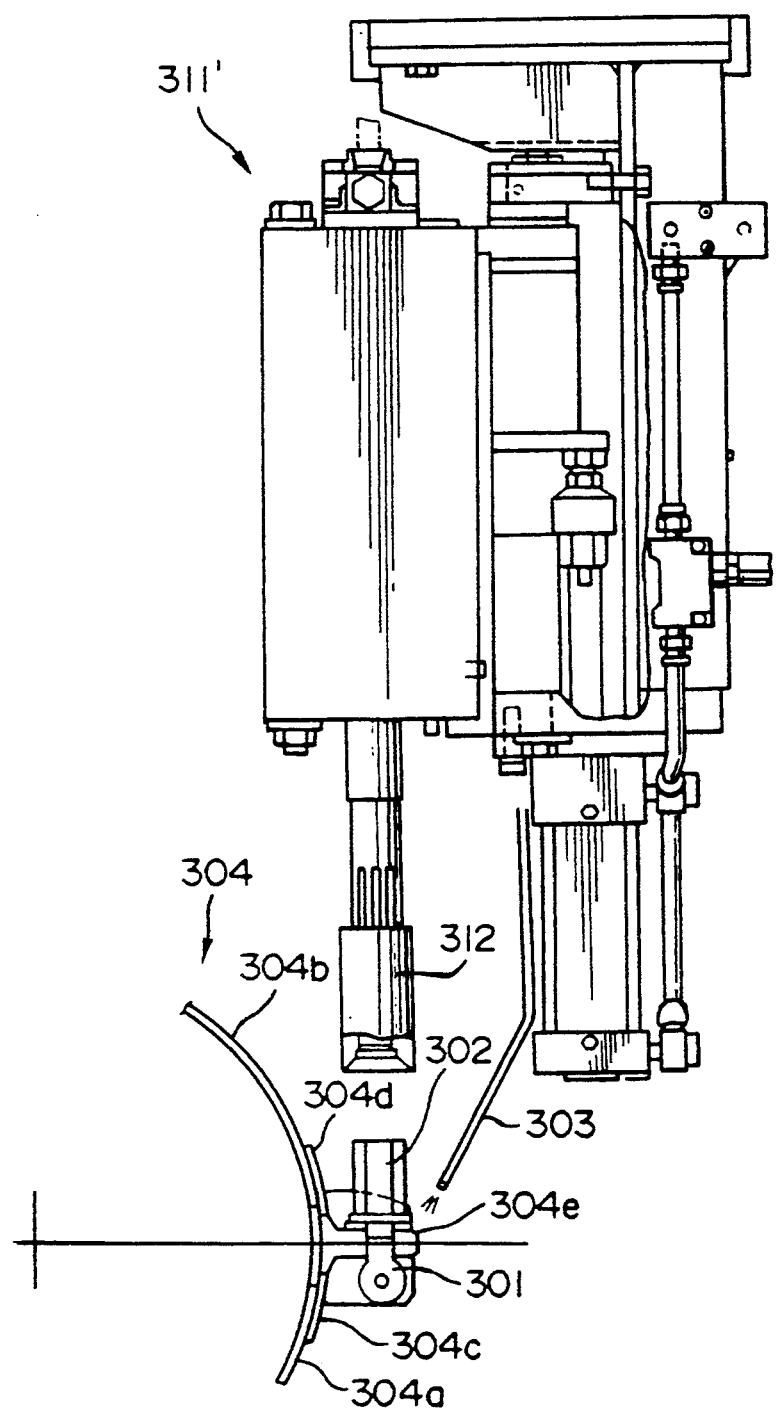
FIGS. 11(a)–11(b) show a configuration of a tightening and untightening device according to another embodiment applicable to the bolt automatic tightening and untightening apparatus.
Figure 11B:
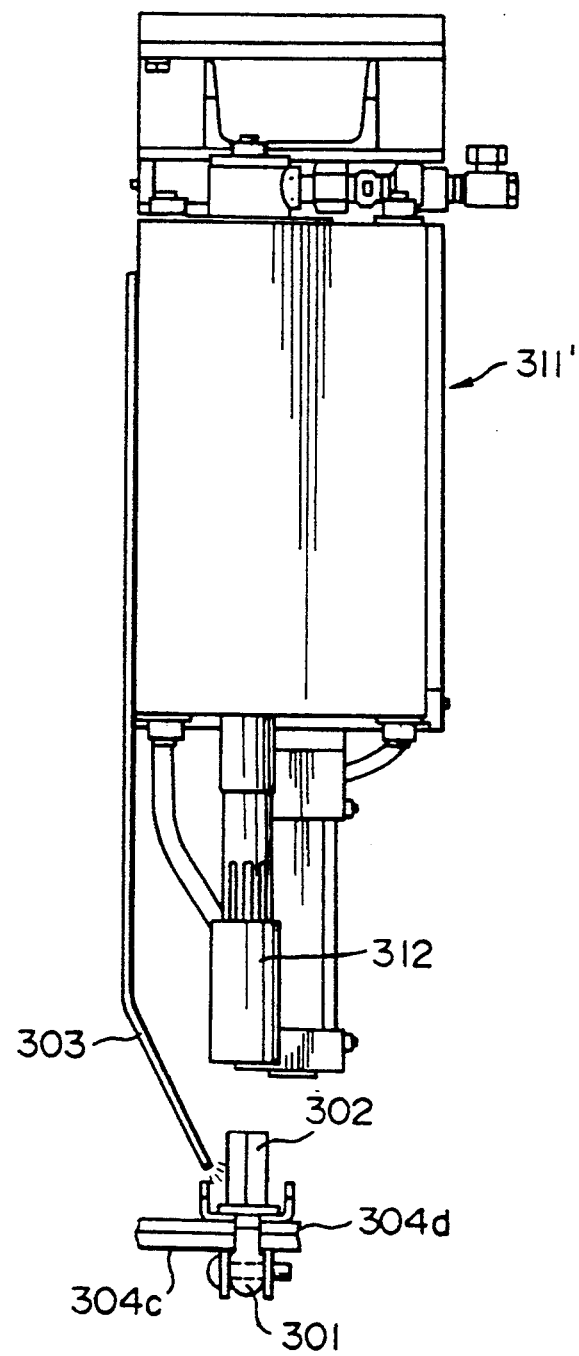

That is, in this embodiment, as shown in FIGS. 11(a) and 11(b), a nozzle 303 comprising a lubricating oil supply device for automatically supplying lubricating oil to thread portions of an eye bolt 301 and/or a nut 302 is provided on a tightening and untightening device 311' comprising the bolt automatic tightening and untightening device, the nozzle 303 being freely moved with the tightening and untightening device 311'.

That is, the eye bolt 301 is provided so as to freely fall and rise in the vicinity of a flange 304 of one split form 304a of a form 304. In the state in which the eye bolt 301 is risen, a body portion thereof is loosely fitted into a notch 304e formed in a flange 304d of a split form 304b, and the nut 302 is threadedly engaged with the eye bolt 304 to thereby assemble the form 304.

In the apparatus of the present embodiment, lubricating oil discharged out of an oil spray unit (not shown) is automatically supplied toward a fastened portion between the eye bolt 301 and the nut 302 through the nozzle 303.

As described above, the lubricating oil supplying nozzle 303 is provided on the tightening and untightening device 311' which is always located accurately to the position of the bolt and nut whereby the automatic supplying function for lubricating oil can be attained with an extremely simple configuration without addition of a new locating mechanism.

Timing of supplying lubricating oil from the nozzle 303 is previously set in the control device of the tightening and untightening apparatus whereby a supply of lubricating oil can be suitably automatically carried out in any state irrespective of prior or posterior to the tightening and untightening of bolts.

As the result, an operator is released from a cumbersome operation of a lubricating oil supplying operation, thus achieving labor saving.

Figure 12:
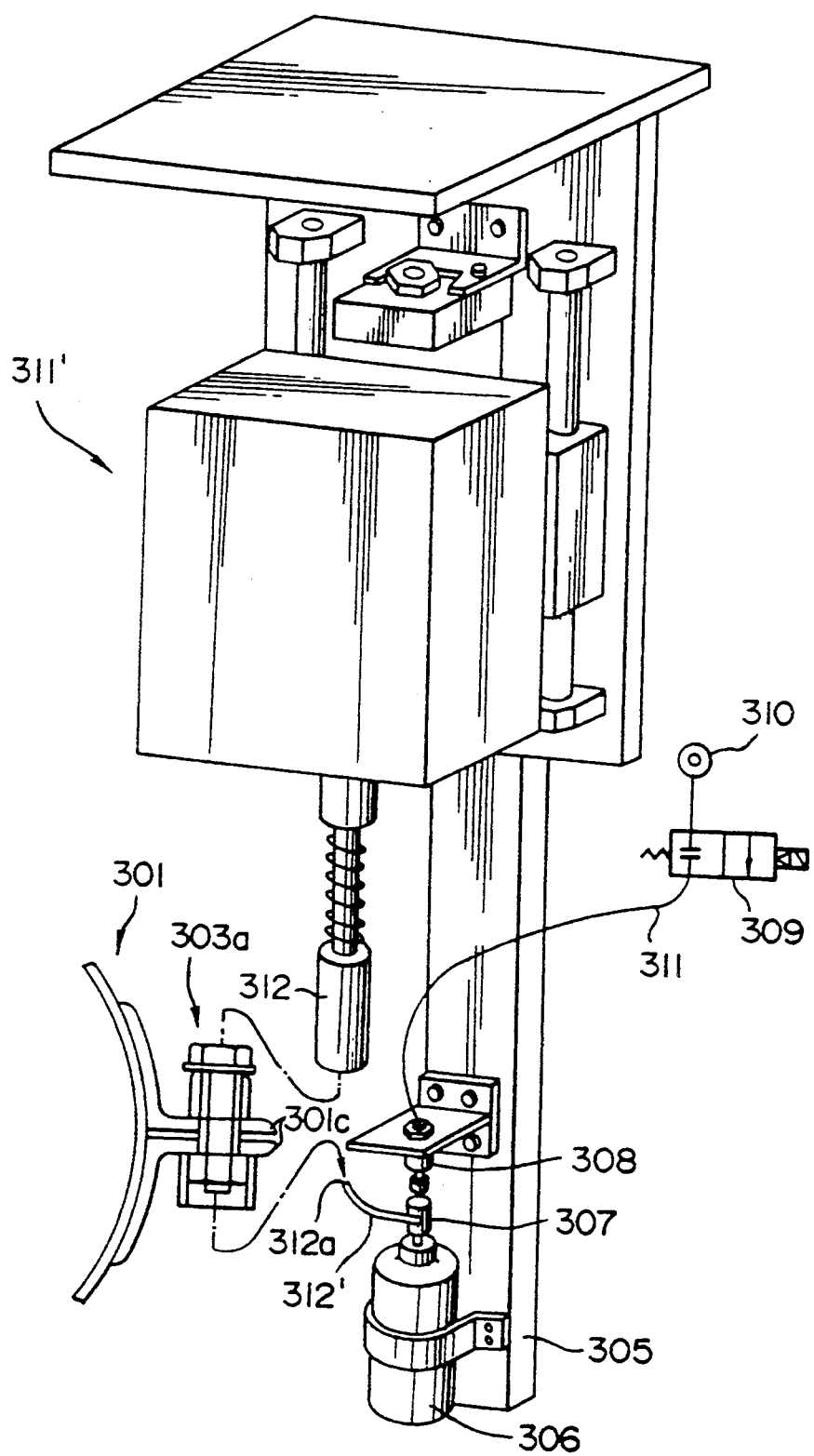
FIG. 12 is a perspective view showing another configuration of the tightening and untightening device.

FIG. 12 shows an apparatus of another embodiment, in which an oil spray can 306 and a cylinder in which a jet button 307 of the oil spray can 306 is pressed to discharge lubricating oil are mounted on a body 305 of a moving machine for supporting a tightening and untightening device 311' movably up and down.

The cylinder 308 is connected to a compressed air source 310 through an electromagnetic valve 309 so that the electromagnetic valve 309 is turned ON/OFF at a predetermined timing whereby the cylinder 308 is operated and lubricating oil is suppled from the oil spray can 306 toward a bolt and nut as described later.

The electromagnetic valve 309 may be provided on the body 305 or the electromagnetic valve 309 and the cylinder 308 are connected by a flexible tube 311 and the electromagnetic valve 309 may be provided on the body side of the tightening and untightening apparatus.

The nozzle 312' connected to the jet button 307 of the oil spray can 306 is arranged upwardly so that lubricating oil may be supplied from the bottom of a bolt 303a of the form 301. An opening 312a of the nozzle 312' is located in such a way that when a socket 312 of the tightening and untightening device 11' is located above the bolt 303a, the opening 312a is opposed from the bottom toward a thread portion thereof.

The nozzle 312' set as described above is effective for a so-called self-standing bolt 303a which is arranged while extending through a flange 301c as in the case of the form 301.

In the above procedure of the lubricating oil supply mechanism, lubricating oil is sprayed after the socket 312 has been located in the case of tightening the bolt 303a while lubricating oil is sprayed after completion of untightening operation in the case of untightening the bolts.

Figure 13:
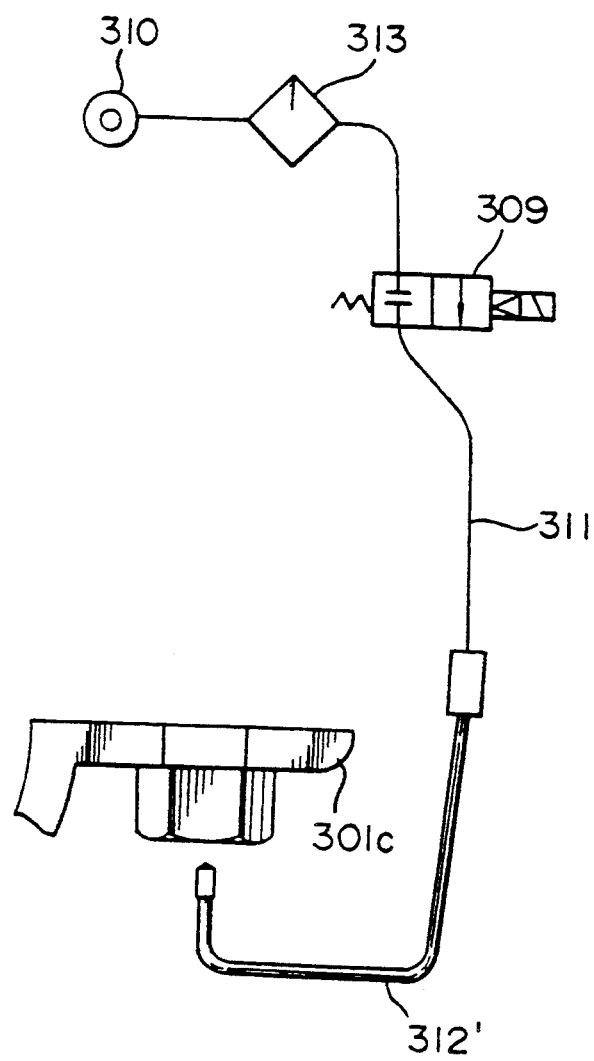
FIG. 13 is an explanatory view showing a lubricating oil supply mechanism applicable to the tightening and untightening device.
Figure 14:
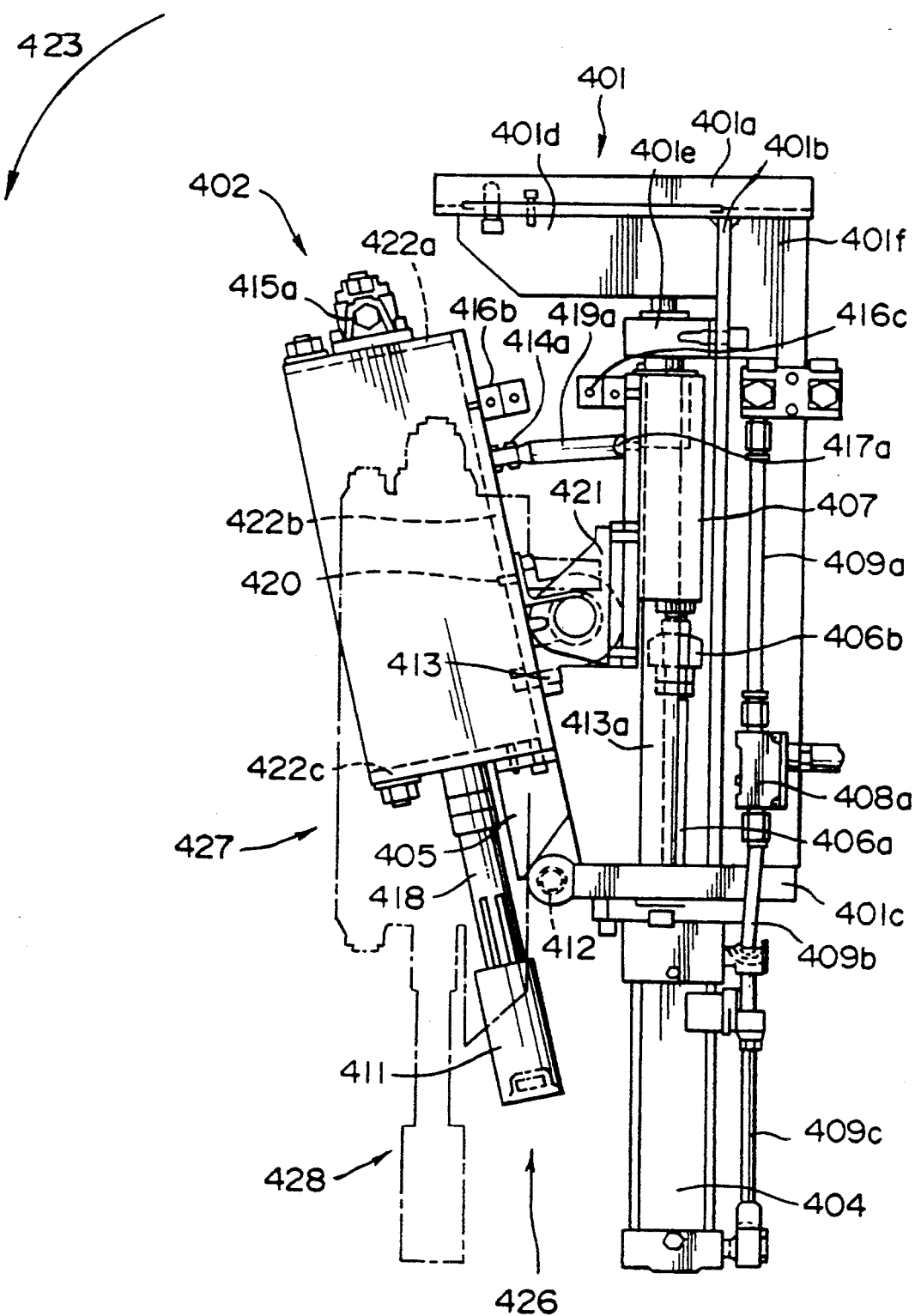
Figure 15:
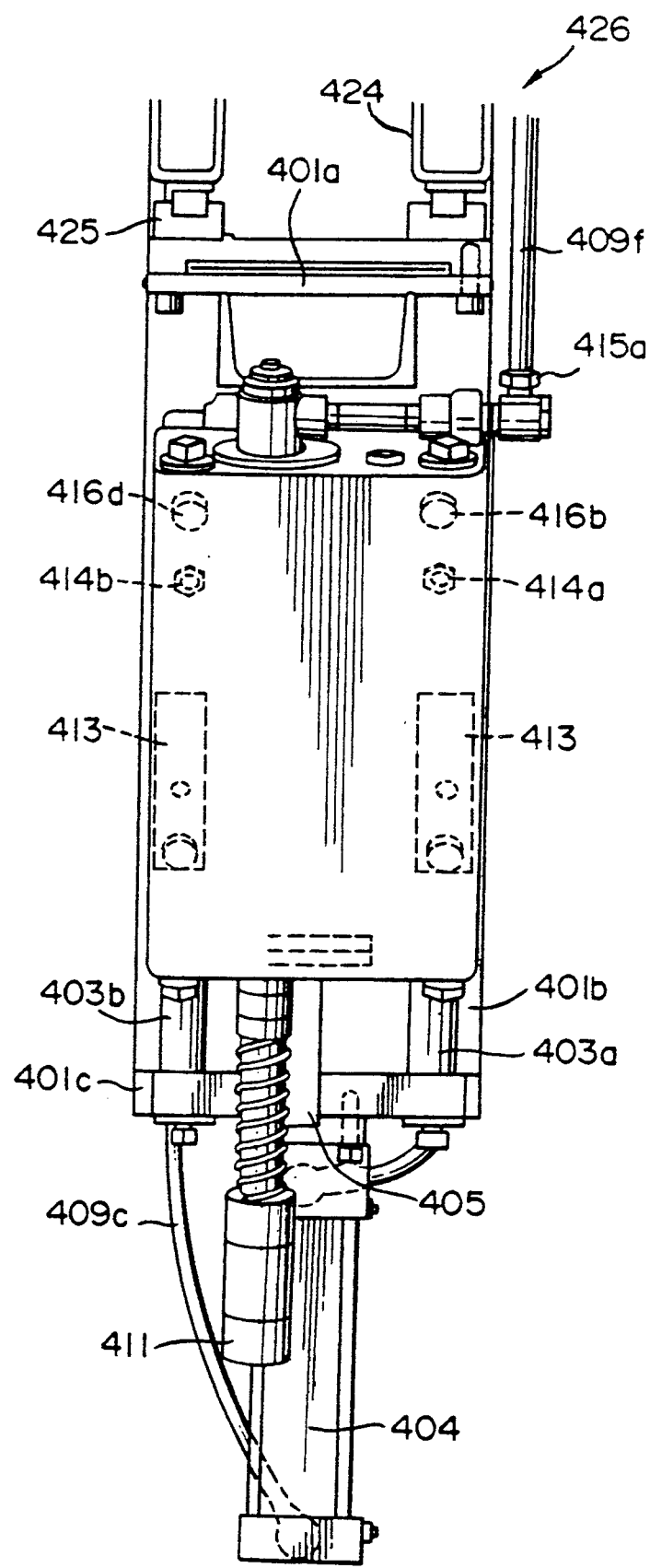
Figure 17:
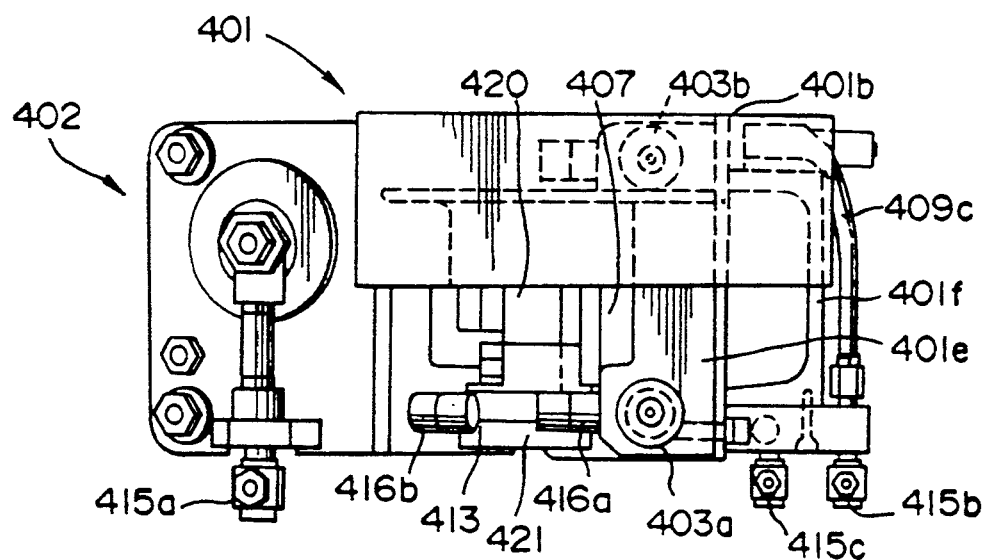

A mechanism shown in FIG. 13 is an example in which the mechanism shown in FIG. 12 is further simplified to be at low cost.

That is, only the nozzle 312' is mounted on the body 305, and is connected to the electromagnetic valve 309, a lubricator 313 and a compressed air source 310 through a flexible tube 311.

In this case, a lubricating oil reservoir is constituted by the lubricator 313, and the electromagnetic valve 309 is turned ON/OFF at preset suitable timing whereby lubricating oil is supplied from the nozzle 312' toward downwardly of a thread member (not shown) for fastening the form 301. In such an apparatus, a plurality of nozzles 312' are connected to a single lubricator 313 and a concentrated control of lubricating oil is effected, thus making it possible to provide a further inexpensive lubricating oil supply mechanism.

That is, in a bolt automatic tightening and untightening apparatus provided with the aforementioned tightening and untightening device, mechanical operation thereof can be utilized to automatically supply lubricating oil to the thread member.

Accordingly, by use of the aforementioned apparatus, the lubricating oil supply operation which relies upon an operator's hand in the conventional apparatus can be accomplished in the present invention, thus contributing to labor saving.

A tightening and untightening device according to another embodiment applicable to the aforementioned bolt automatic tightening and untightening apparatuses will be described hereinbelow.

As shown in FIGS. 14 to 17, a tightening and untightening device 426 according to this embodiment comprises a body 401 and a tightening and untightening tool 402.

The body 401 comprises a body intermediate plate 401b, and a body top plate 401a and a body bottom plate 401c which are mounted in the form of U-shape on the body intermediate plate 401b at both ends thereof. A U-shaped rib 401f is provided on the back surface of the body intermediate plate 401b, and a U-shaped rib 401d is provided on the undersurface of the body top plate 401a.

A lifter cylinder 404 having a piston rod 406a is mounted at a lower portion of the body bottom plate 401c in such a way that the piston rod 406a upwardly extends through the body bottom plate 401c. The lifter cylinder 404 is of a double acting type, and one cylinder chamber thereof is connected to an air tube 409b which is in turn connected to an air tube 409a through a speed controller 408a. The air tube 409a is in turn connected through a joint 415b to an air tube 409e, which is connected to an air source through an electromagnetic valve. A joint 415b is also connected to an air tube 409d, which is connected to an air tube 409c through a speed controller 408b. The air tube 409c is connected to the other cylinder chamber of the lifter cylinder 404. Air is supplied to the cylinder chambers through the aforementioned air tubes 409a to 409e to actuate the double-acting lifter cylinder 404.

A pair of guide rods 403a and 403b are provided between a body stop plate 401e mounted on the body intermediate plate 401b and the body bottom plate 401c, and a lifter table 407 is mounted on a free joint 406b mounted on the extreme end of the piston rod 406a, the lifter table 407 being moved up and down along the guide rods 403a and 403b.

The tightening and untightening device 402 comprises a tightening and untightening tool body 427 mounted on a box-like mounting plate comprising a top plate 422a, a side plate 422b and a bottom plate 422c, and a socket portion 428 with a socket 411 mounted on the extreme end of a shaft 418. The socket portion 428 is provided downwardly from the bottom of the bottom plate 422c of the tightening and untightening tool body 427. A joint 415a is mounted above the top plate 422a, and an air tube 409f for rotating the socket portion 428 is connected to the joint 415a.

A first trunion 413 is mounted on the side plate 422b, and a second trunion 421 is mounted on the lifter table 407 while being opposed to the first trunion 413. A pin 420 is extended between the first trunion 413 and the second trunion 421 so that the tightening and untightening tool 402 can be tilted. The first trunion 413 is mounted below the side plate 422b, and the tightening and untightening tool 402 in a natural state is inclined as indicated by the solid line in FIG. 14 because a turning moment about the pin 420 is generated in a direction indicated at an arrow 423 in FIG. 14 by its weight.

A spring receiver 417a and a spring receiving seat 414a are provided on the lifter table 407 and the side plate 422b, respectively, and an auxiliary spring 419a is mounted between the spring receiver 417a and the spring receiving seat 414a to define the range of inclination caused by the own weight of the tightening and untightening tool 402. Although not shown, a set of spring mechanisms corresponding to the spring receiving seat 414a, the spring receiver 17a and the auxiliary spring 419a are also provided on the left hand in FIG. 15. A pair of dampers 416b and 416d are provided on the side plate 422b, and a set of dampers 416a and 416c are also mounted on the lifter table 407 while being opposed to the pair of dampers 416b and 416d provided on the side plate 422b. The two sets of dampers 416a, 416b and 416c, 416d absorb a shock when the tightening and untightening tool 402 is changed in its state from the inclined state (shown by the solid line in FIG. 14) to the stood-upright state (shown by the phantom line in FIG. 14).

Figure 5:
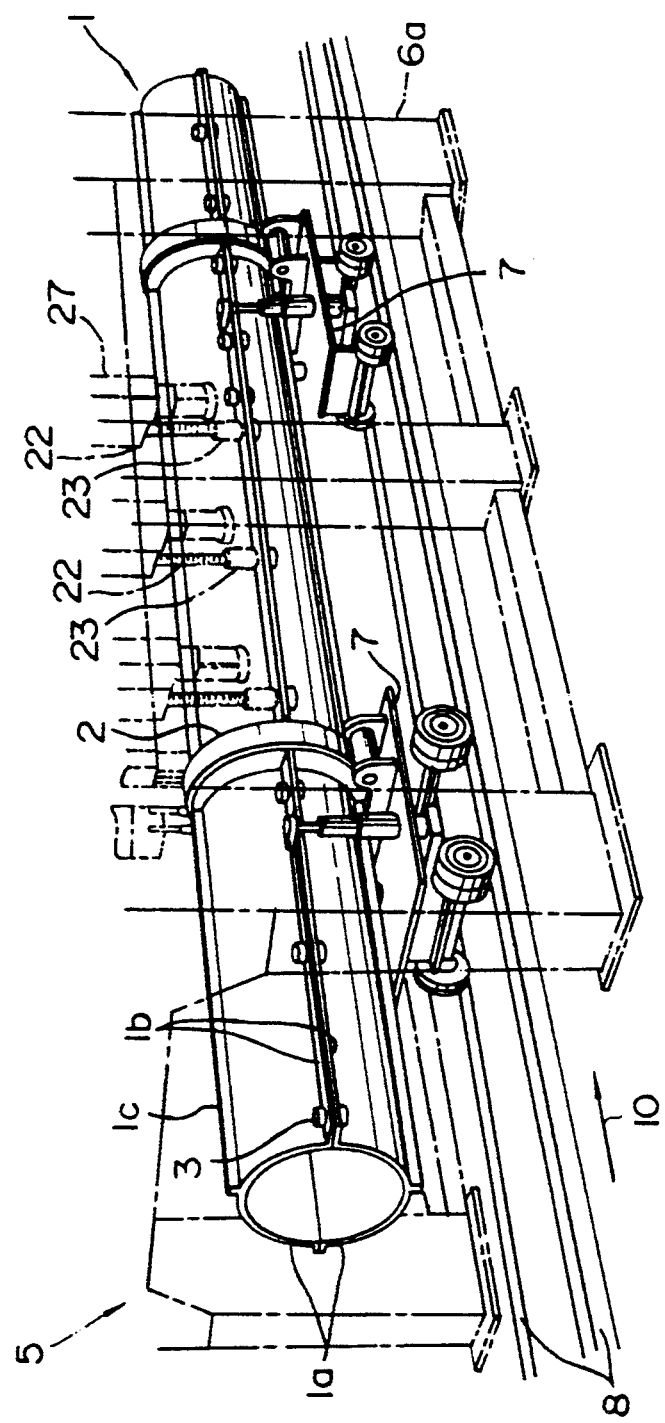
FIG. 5 is an explanatory view where bolts of the form are automatically tightened and untightened by the bolt automatic tightening and untightening apparatus.

The tightening and untightening device 426 is mounted on the upper portion of the form 1 in place of the aforementioned tightening and untightening device 22 in FIGS. 1 and 5. This tightening and untightening device 426 can be moved laterally in FIG. 1(c) by guide rails 425 mounted on the body top plate 401a and rails 424 combined with the rail guides 425.

Next, the operation of the tightening and untightening device will be described below.

The operation of the movement of the body 24 of the bolt tightening and untightening mechanism with the form 1 is the same as that shown in the aforementioned embodiments and the description thereof is omitted. The operation of the tightening and untightening device 426 will be described here. In tightening and untightening bolts, the lifter table 407 and the tightening and untightening tool 402 connected to the lifter table 407 are moved down by the function of the lifter cylinder 404. At that time, the guide plate 405 having an inclined surface provided at the lower portion of the bottom plate 422c of the tightening and untightening tool 402 comes into contact with the roller 412 provided on the side of the body bottom plate 401c whereby the tool 402 is moved down and changed in its state from the inclined state (shown by the solid line in FIG. 14) to the stood-upright state (shown by the phantom line in FIG. 14). At this time, the pair of dampers 416b, 416d mounted on the side plate 422b and the pair of dampers 416a, 416c mounted on the lifter table 407 absorb the shock resulting from the contact between the tightening and untightening tool 402 and the body 401.

After the bolts have been tightened and untightened, when the lifter table 407 is moved upward by the function of the lifter cylinder 404, the roller 412 is disengaged from the guide plate 405. Then, the tightening and untightening tool 42 is tilted in a direction indicated by an arrow 423 in FIG. 14 by its own weight, and therefore, the tightening and untightening tool 402 is deviated from an interference region when the tire 2 provided on the form 1 is moved to avoid the contact between the tightening and untightening tool 402 and the tire 2.

Figure 18:
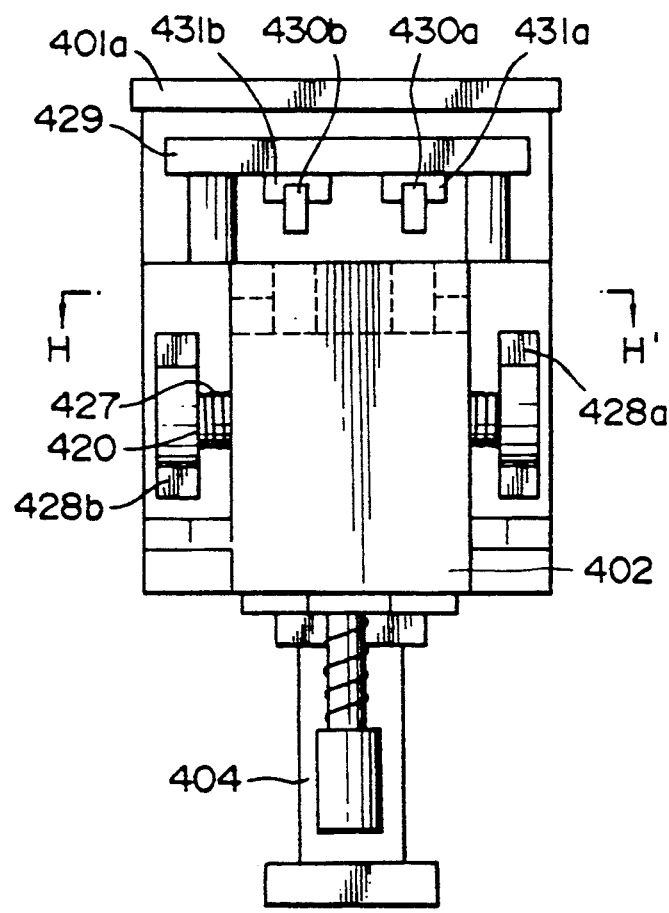
FIGS. 18 to 20 show a configuration of another embodiment of the tightening and untightening device.
Figure 19:
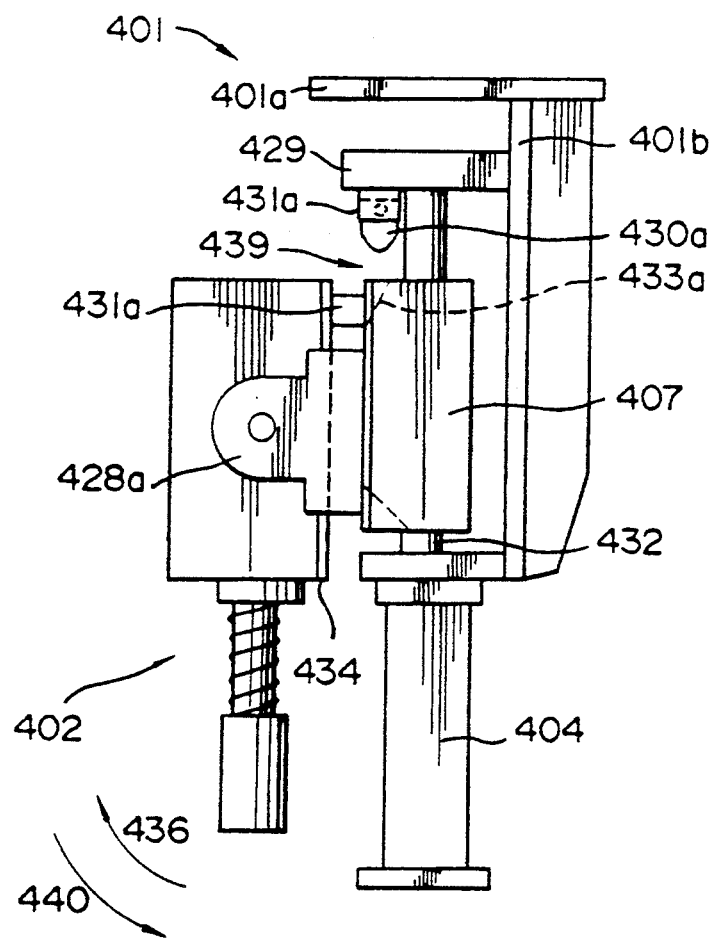
Figure 20:
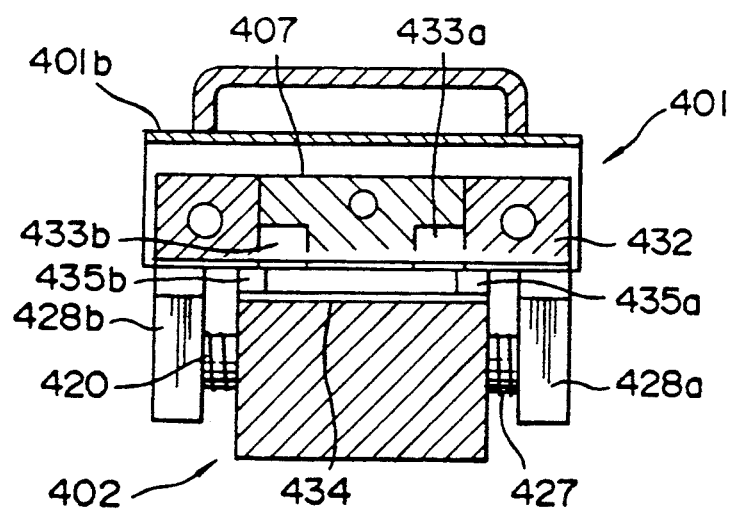

Next, another embodiment will be described with reference to FIGS. 18 to 20. FIG. 18 is a front view, FIG. 19 is a side view and FIG. 20 is a sectional view taken along H-H' of FIG. 18. The same parts as those shown in the aforementioned embodiments are omitted from description and only those different therefrom will be described.

In FIGS. 18 to 20, in a tightening and untightening tool 402, a pin 420 about which a spiral spring 427 is wound extends therethrough parallel with a center shaft of the tire, and opposite ends of the pin 420 are rotatably supported by two trunions 428a and 428b mounted on the lifter table 407 to thereby render the tightening and untightening tool 402 tiltable.

Below a top plate 401a, a lateral plate 429 is mounted on a back plate 401b so as to be parallel with the top plate 401a. A cam shaft and the pin 420 are mounted parallel with each other on the lower surface of the lateral plate 429 with cams 430a, 430b and cam receives 431a, 431b for receiving the cams 430a, 430b aligned in parallel.

Above a side plate 432 of the lifter table 407 are provided two grooves 433a, 433b so as to be fitted into the cams 430a, 430b, and above a side plate 434 of the tightening and untightening tool 402 are mounted stoppers 435a, 435b.

The operation of this embodiment will be described hereinbelow.

A force rotated in a direction indicated by an arrow 436 in FIG. 19 by means of the spring 427 is applied to the tightening and untightening tool 402, and the stoppers 435a and 435b are urged against the body 401. Thus, the tightening and untightening tool 402 is moved to an upright state to tighten and untighten bolts.

When the lifter table 407 is moved upward by the function of the lifter cylinder 404 after the bolts have been tightened and untightened, the cams 430a and 430b are fitted into the grooves 433a and 433b respectively, and at that position, the cams 430a and 430b are rotated in a direction indicated by an arrow 439 in FIG. 19 whereby the tightening and untightening tool 402 is tilted in a direction indicated by an arrow 440 in FIG. 19 to avoid the contact with the tire of the form.

The present apparatus is not limited to the aforementioned two embodiments. The tightening and untightening tool 402 need be moved to and from the direction of the threaded shaft but the direction of the threaded shaft need not be the vertical direction as in the embodiment. That is, the form 1 is rotated about its center axis, and bolts are arranged up and down and the tightening and untightening tool 402 may be moved in a horizontal direction. Furthermore, in the aforementioned embodiments, the guide plate 405 is mounted on the tightening and untightening tool 402 and the roller 412 is mounted on the body 401, it is to be noted that the roller 412 may be mounted on the tightening and untightening tool 402 and the guide plate 405 may be mounted on the body 401. It is further noted that the inclined surface of the guide plate 405 may comprise not only a straight line but a curve.

If the tightening and untightening tool 402 is tilted about the pin 420 parallel with the direction of the center axis of the form 1, the stroke to avoid the contact with the tire 2 becomes minimum. However, the direction of the center axis of the form 1 and the center axis of the tilting of the tightening and untightening tool 402 may not be completely parallel and may be substantially parallel with each other.

Instead of mounting the guide plate 405, the roller 412 and the cams 430a and 430b, a rotating power source such as a rotary actuator, a motor, etc. may be provided on the pin 420 to drive the tightening and untightening tool 402.

It is further noted that the tightening and untightening tool 402 and the lifter cylinder 404 are not limited to be driven by air but an electrically or hydraulically driven means may be employed.

In the aforementioned embodiments, the form 1 and the bolt tightening and untightening mechanism body 24 move in a close contact state and tightening and untightening of bolts are effected during movement thereof, it is to be noted that the form 1 and the body 24 of the bolt tightening and untightening mechanism stop a close contact state, and tightening and untightening of bolts are effected during the stopping, after which they may be moved.

In the apparatus of the present embodiment, not only tightening and untightening of bolts but also tightening and untightening of nuts fall within the scope of right thereof, similarly to the apparatuses of the aforementioned embodiments.

That is, the apparatus provided with the tightening and untightening device according to the present invention of course has the effects as in the case of the apparatuses of the aforementioned embodiments. In addition, as described above, when the form 1 is relatively moved with respect to the tightening and untightening device 426, the tightening and untightening tool 402 is tilted about an axis substantially parallel with the direction of the center axis of the form 1 to thereby avoid the contact with the tire 2 provided on the form 1. Since the contact between the tightening and untightening tool 402 and the tire 2 can be avoided by tilting the tightening and untightening tool 402 as just mentioned, a large stroke is not necessary for moving up and down the tightening and untightening tool 402, thus providing a small-sized bolt automatic tightening and untightening apparatus which is short in cycle time required for tightening and untightening.

As means for tilting the tightening and untightening tool 402, either the tightening and untightening tool 402 or the body 401 is provided with the roller 412, and the other is provided with the guide plate 405 having an inclined surface in contact with the circumferential surface of the roller 412, whereby the tilting mechanism of the tightening and untightening tool 402 can be simplified.

A tightening and untightening device according to a still another embodiment applicable to the aforementioned bolt automatic tightening and untightening apparatus will be described hereinbelow.

That is, the tightening and untightening device according to this embodiment is similar in basic construction to the aforementioned tightening and untightening devices except that as shown in FIG. 21, a tightening and untightening device 526 is supported tiltably about an axis substantially parallel with the center axis of the form 1 or 101 (see FIGS. 1, 5, 25 and 26), and the tightening and untightening device 526 is provided with a tilting mechanism 529 which engages an eye bolt 103c and/or a nut 103d (see FIG. 23) released from its fastened state by the tightening and untightening device 526 to cause the eye bolt 103c with the operation of the tightening and untightening device 526.

Figure 23A:
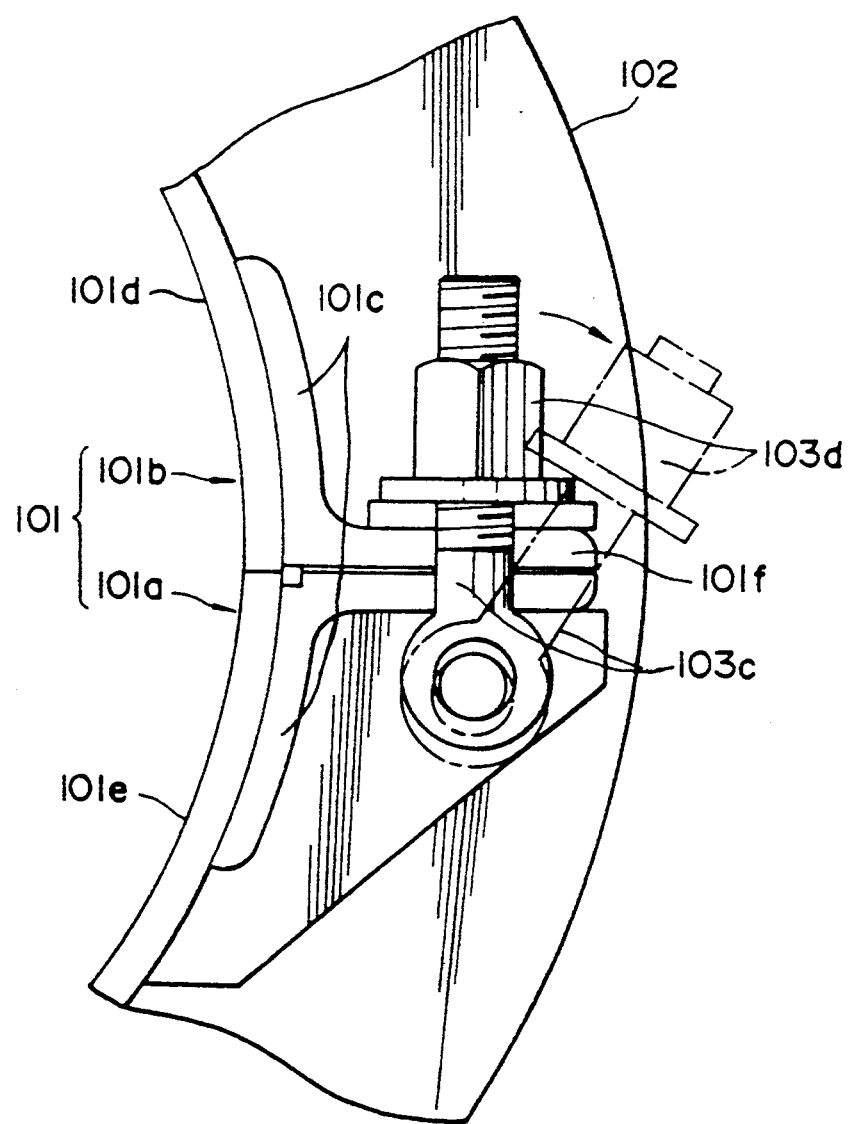
FIGS. 23(a)–23(b) shows a configuration of essential parts of one example of a form.
Figure 23B:
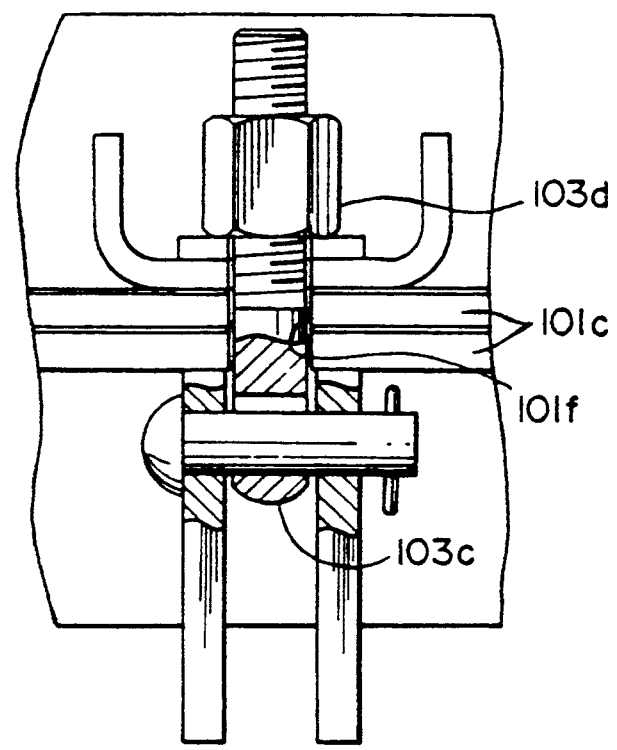
Figure 24A:
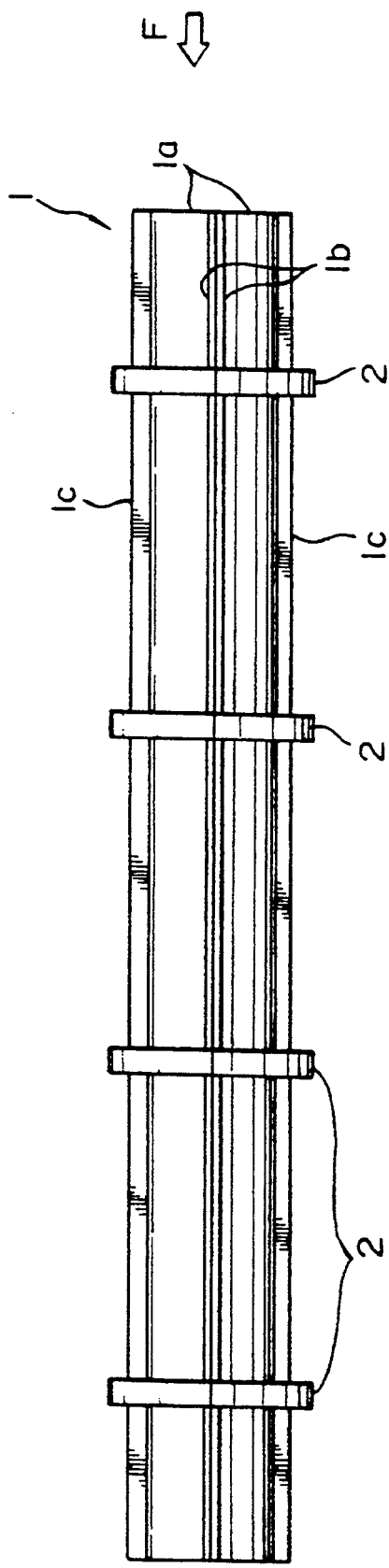
FIGS. 24(a)–24(c) show one example of a form capable of tigtening and untightening bolts by the bolt automatic tightening and untightening apparatus.
Figure 24B:
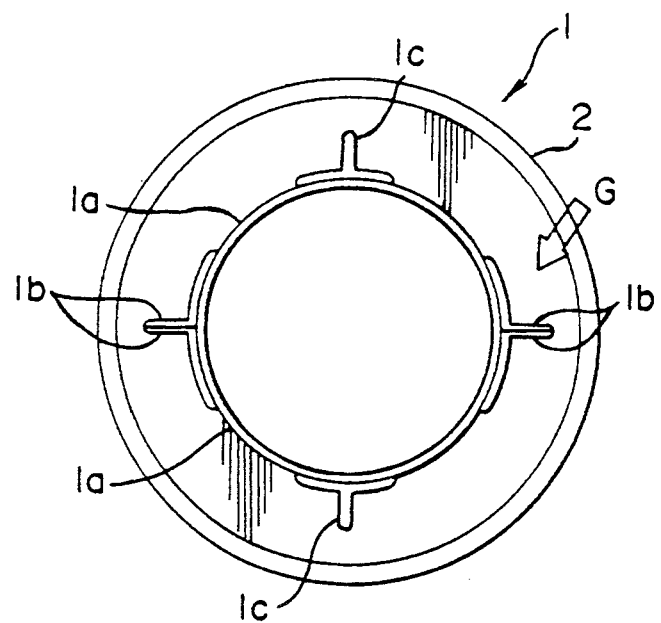
Figure 24C:
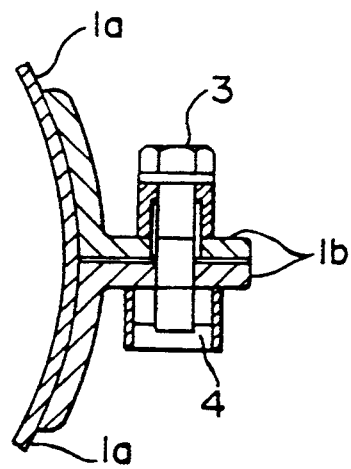
Figure 25:
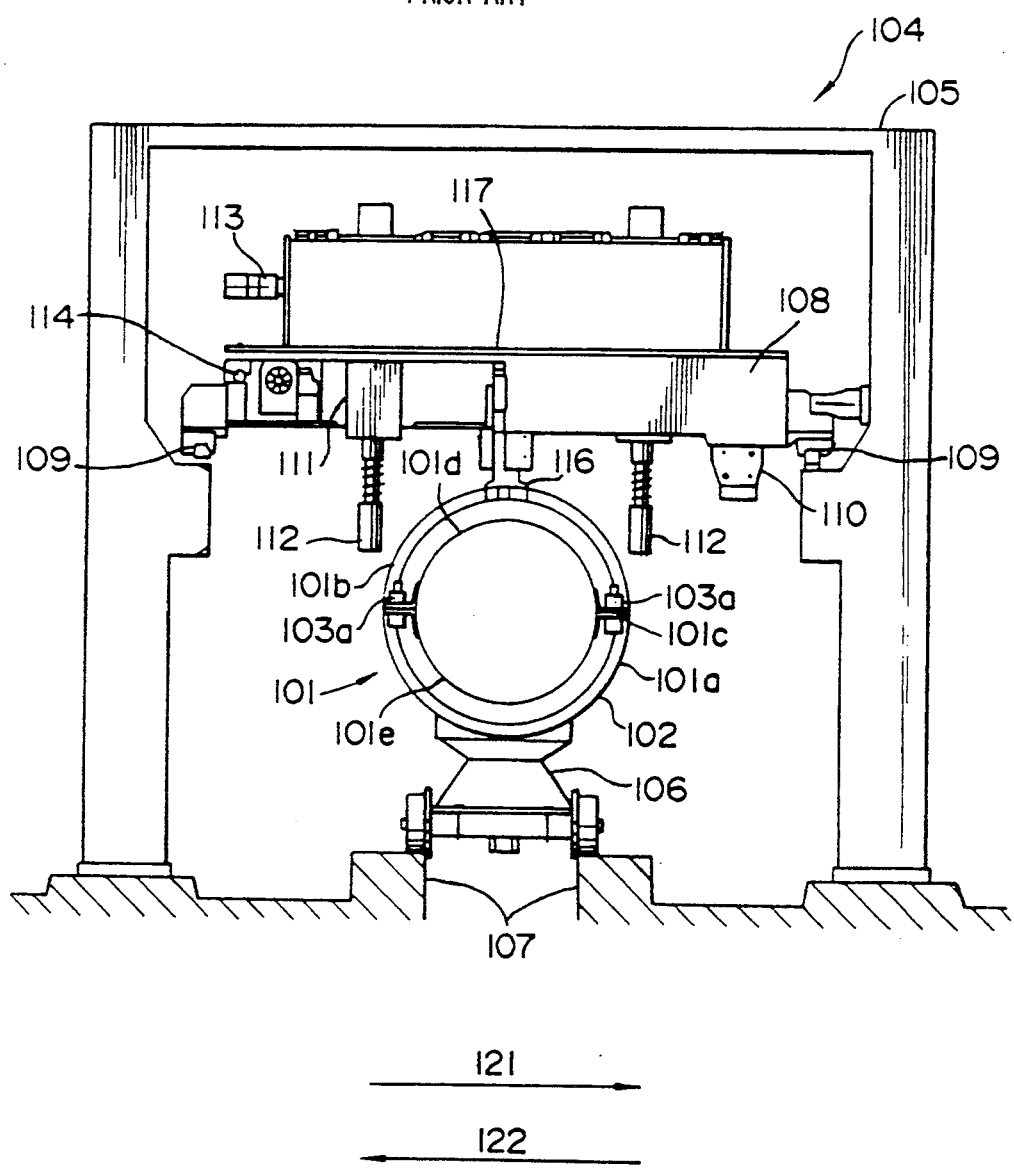
FIGS. 25 and 26 show the entire configuration of a conventional bolt automatic tightening and untightening apparatus.
Figure 26:
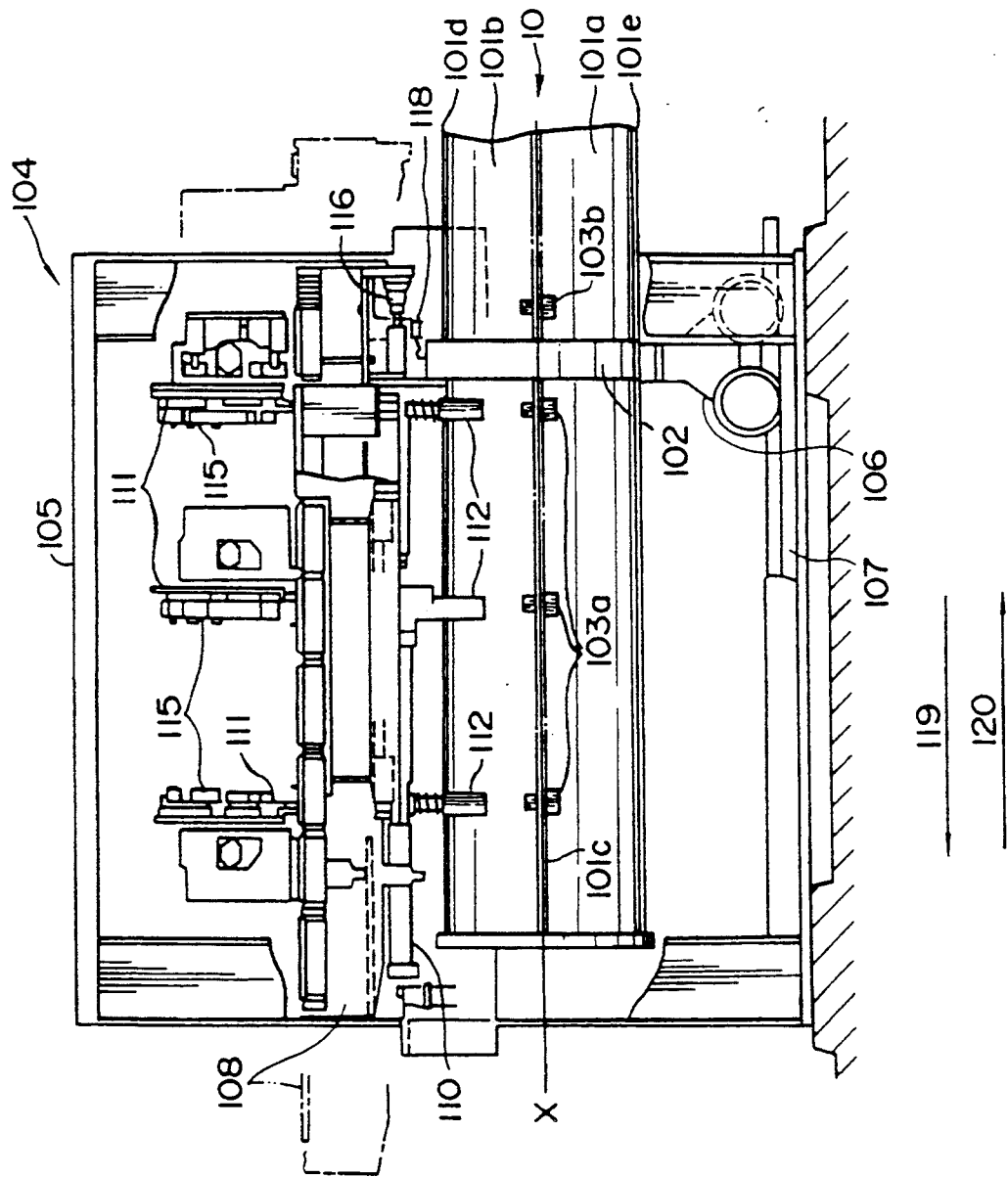

With respect to the eye bolt 103c and nut 103d, as shown in FIGS. 23(a) and 23(b), the eye bolt 103c is provided so as to freely rise and fall within a surface substantially a right angle to the center axis running the lengthwise in the vicinity of a flange 101c of a lower split form 101a, and in the state in which the eye bolt 103c is stood upright, its body is loosely fitted into a notch 101f formed along the lengthwise of the flange 101c of an upper split form 101b.

In this state, the nut 103d is threadedly engaged with the threaded portion of the eye bolt 103c whereby the split forms 101a and 101b are combined with each other into an integral form 101.

The tightening and untightening device 526 according to the present embodiment comprises a body 501 and a tightening and untightening device 502.

The body 501 comprises a body intermediate plate 501b, and body top plates 501a and a body bottom plate 501c which are mounted in the form of a U-shape on the body intermediate plate 501b at opposed ends thereof. The body intermediate plate 501b has a U-shaped rib 501f on the back surface thereof and the body top plate 501a has a U-shaped rib 501d on the lower surface thereof.

A lifter cylinder 504 having a piston rod 506a is mounted on the lower portion of the body bottom plate 501c so that the piston rod 506a upwardly extends through the body bottom plate 501c.

The lifter cylinder 504 is of a double acting type, and one cylinder chamber thereof is connected to an air tube 509b which is in turn connected to an air tube 509a through a speed controller 508a. The air tube 509a is connected through a joint 515b to the other air tube, which is connected to an air source through an electromagnetic valve. Further, the joint 515b is connected to the air tube, which is connected to an air tube 509c through a speed controller, the air tube 509c being connected to the other cylinder chamber of the lifter cylinder 504. Air is supplied to the cylinder chambers through the above air tubes to actuate the double acting lifter cylinder 504.

A pair of guide rods 503a and 503b are extended between a body stop plate 501e mounted on the body intermediate plate 501b and the body bottom plate 501c, and a lifter table 507 is mounted on a free joint 506b mounted on the extreme end of the piston rod 506a, the lifter table 507 being moved up and down along the guide rods 503a and 503b.

The tightening and untightening device 502 comprises a tightening and untightening tool body 527 mounted on a box-like mounting plate comprising a top plate 522a, a side plate 522b and a bottom plate 522c, and a socket portion 528 in which a socket 511 is mounted on the extreme end of a shaft 518. The socket portion 528 is provided downwardly from the bottom of the bottom plate 522c of the tightening and untightening tool body 527. A joint 515a is mounted on the upper portion of the top plate 522a, and an air tube 509f for rotating the socket portion 528 is connected to the joint 515a.

A first trunion 513 is mounted on the side plate 522b, and a second trunion 521 is mounted on the lifter table 507 while being opposed to the first trunion 513. A pin 520 is extended between the first trunion 513 and the second trunion 521 to thereby render the tightening and untightening tool 502 tiltable. The first trunion 513 is mounted below the side plate 522b, and the tightening and untightening tool 502 in a natural state is inclined as indicated by the solid line in FIG. 21(a) because a turning moment about the pin 520 is generated in a direction indicated by an arrow 523 in FIG. 21(a) due to its own weight.

A spring receiver 517a is provided on the lfter table 507 and a spring receiving seat 514a is provided on the side plate 522b. An auxiliary spring (a push spring) 519a is mounted between the spring receiver 517a and the spring receiving seat 514a so that the speed of inclination of the tightening and untightening tool 502 due to its own weight thereof is made faster to rapidly effect withdrawing operation of the tightening and untightening tool 502. The guide plate 505 defines the range of inclination of the tightening and untightening tool 502. Although not shown, a set of spring mechanisms corresponding to the spring receiving seat 514a, the spring receiver 517a and the auxiliary spring 519a are also provided on the left hand of FIG. 21(b). A pair of dampers 516b and 516d are provided on the side plate 522b, and a set of dampers 516c (516c) are also provided on the lifter table 507 while being opposed to the pair of dampers 516b and 516d provided on the side plate 522b. The two sets of dampers 516c, 516b and 516c, 516d absorb a shock produced when the tightening and untightening device 502 is changed in its state from the inclined state (shown by the solid line in FIG. 21(a)) to the stood-upright state (shown by the phantom line in FIG. 21(a)).

The tightening and untightening device 526 is mounted on the upper portion of the form 101, for example, in place of the tightening and untightening device 22 in FIGS. 1(a) and 1(b). This tightening and untightening device 526 can be moved laterally in FIG. 1(c) by rail guides 525 mounted on the body top plate 501a and rails 524 combined with rail guides 525.

Further, in the apparatus of the present embodiment, the tilting mechanism 529 is mounted on the lower end of the tightening and untightening tool body 527.

In the tilting mechanism 529, a tiling member 530 formed, for example, from a plate-like rubber plate bent into a substantially L-shape is supported slidably up and down by a set of shafts 532 and 532 mounted on a bracket 531 corresponding to the socket 511 and is always biased downwardly by means of a spring 533.

The tilting member 530 is supported slidably up and down as described above in order that when the socket 511 is mounted on or removed from the nut 103d, the tilting member 530 can be elastically withdrawn upwardly so as to prevent the member 530 from being obstructed.

Figure 22A:
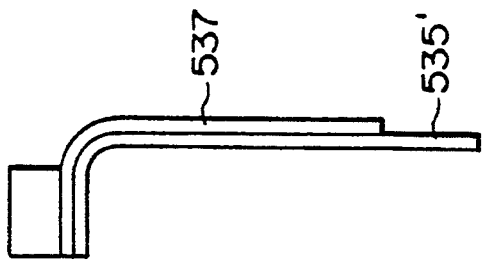
FIGS. 22(a), 22(b) and 22(c) are respectively front views of a tilting member applicable to the tightening and untightening device.
Figure 22B:
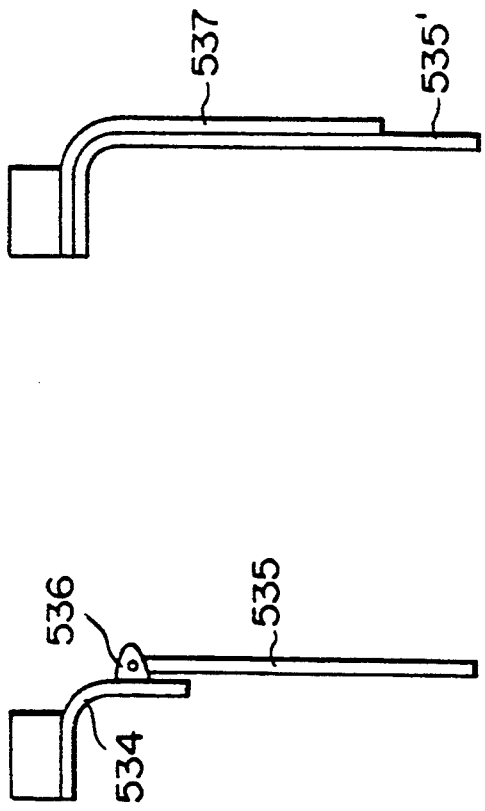
Figure 22C:
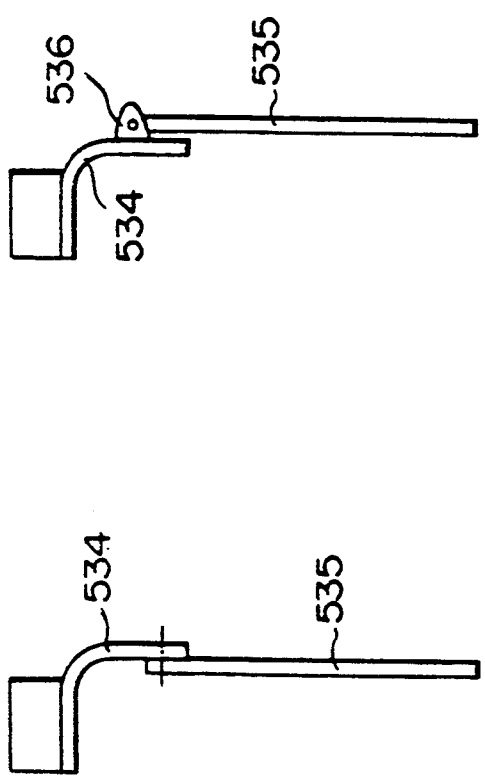

The tilting member 530 may be formed by mounting a rubber plate 535 on the extreme end of a metal plate 534 bent into an L-shape, or may have a rockable construction formed by connecting a rubber plate 535 to a metal plate 534 through a hinge 536 as shown in FIG. 22(b). Furthermore, as shown in FIG. 22(c), a spring steel plate 537 bent into an L-shape and a rubber plate 535' may be overlapped. In this case, if a spring rigidity of the spring steel plate 537 is increased, a fluctuation of the tilting member 530 itself can be stabilized quickly to achieve a better attitude maintaining state.

The operation of the tightening and untightening device configured as described above will be described hereinbelow.

The operation in which the body 24 of the bolt tightening and untightening mechanism moves along the form 101, for example, is the same as illustrated in the aforementioned embodiments, and therefore, a description thereof is omitted.

The operation of the tightening and untightening device 526 will be described hereinbelow.

For example, in a case where the nut 103d is untightened, the lifter table 507 and the tightening and untightening device 502 connected to the lifter table 507 are moved down by the function of the lifter cylinder 504. At this time, the guide plate 505 having an inclined surface provided at the lower portion of the bottom plate 522 of the tightening and untightening device 502 comes into contact with the roller 512 provided on the side of the body bottom plate 501c whereby the tightening and untightening device 502 is moved down and changed in its state from the inclined state (shown by the solid line in FIG. 21(a)) to the stood upright state (shown by the phantom line in FIG. 21(a)). At this time, the pair of dampers 516b and 516d mounted on the side plate 522b and the pair of dampers 516c (516c) mounted on the lifter table 507 absorb the shock resulting from the contact between the tightening and untightening device 502 and the body 501.

At this time, the extreme end of the tilting member 530 is to come into contact with the nut 103d but the tilting member 530 is withdrawn up and down at the same time when the member 530 is elastically bent whereby the tilting member 530 enters the opposite side of the nut 103d.

In this manner, the socket 511 is fitted into the nut 103d and the socket 511 is rotated to thereby release the fastened state of the nut 103d with respect to the eye bolt 103c, and the eye bolt 103c becomes in a tiltable state.

Figure 21A:
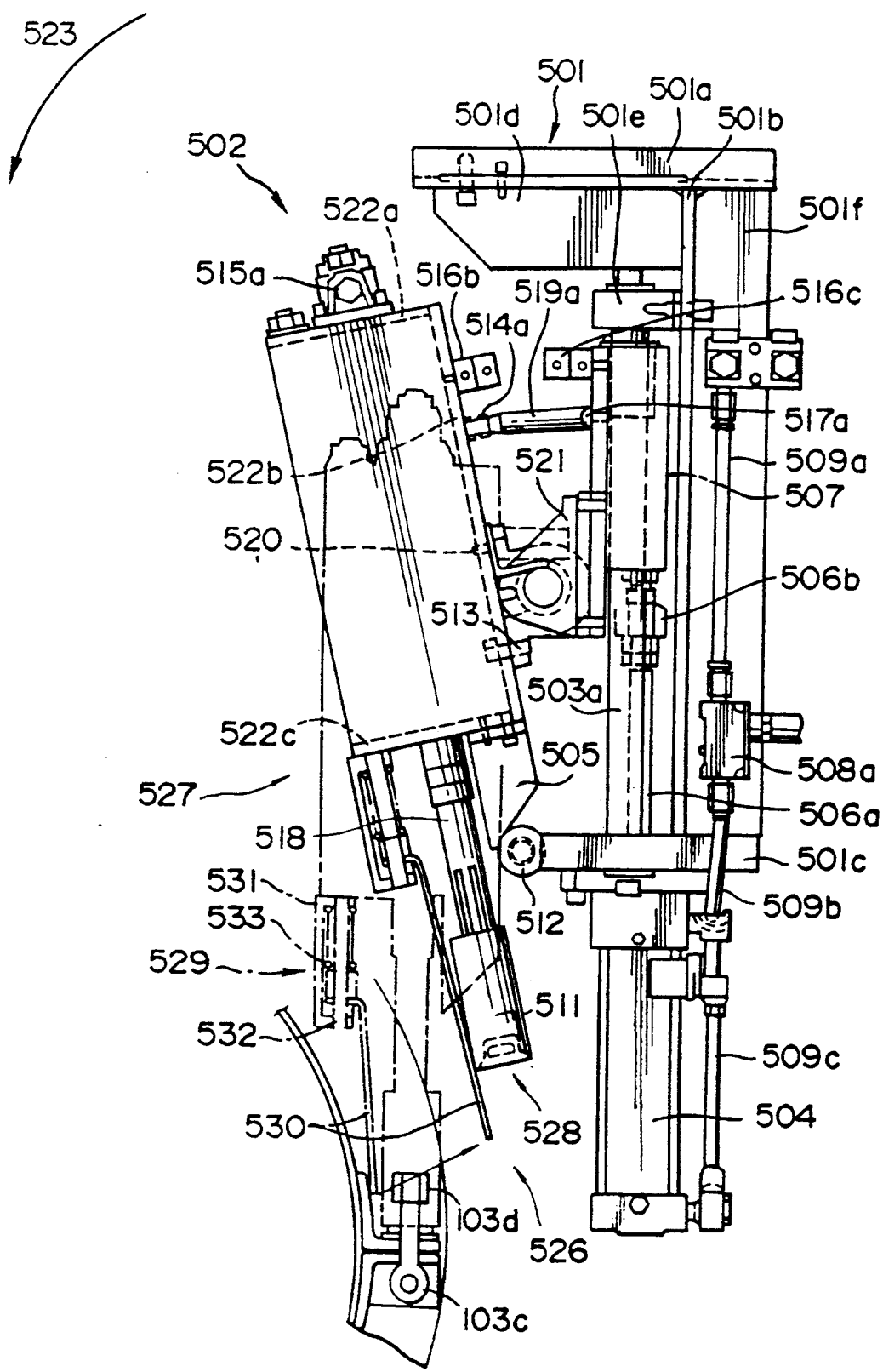
FIGS. 21(a)–21(b) show a configuration of a tightening and untightening device according to another embodiment applicable to the bolt automatic tightening and untightening apparatus.
Figure 21B:
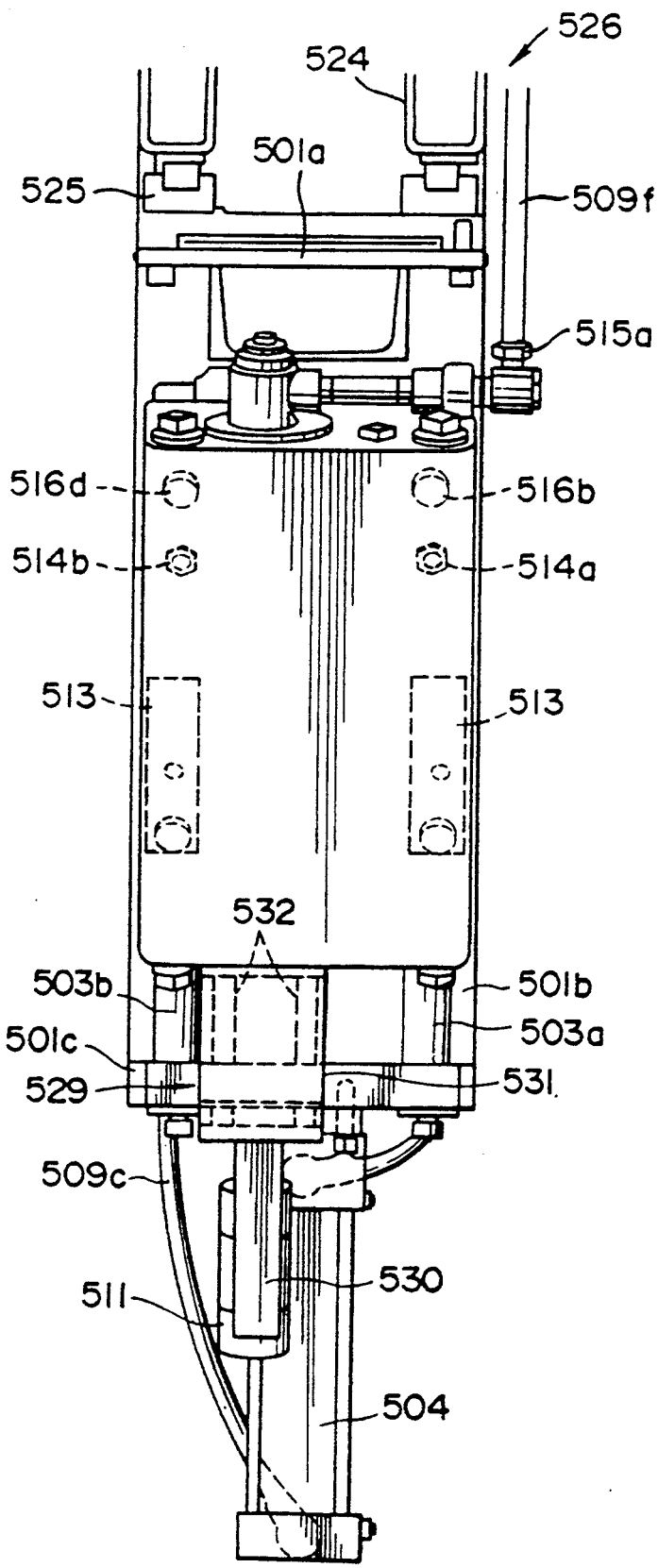

When the lifter table 507 is moved upward by the function of the lifter cylinder 504 after the aforementioned fastened state has been released as described above, the roller 512 and the guide plate 505 move, while being engaged with each other, along the inclined surface of the guide plate 505 by the own weight of the tightening and untightening device 502 and by the function of the auxilary spring (push spring) 519a, to be tilted as a whole in a direction as indicated by an arrow in FIG. 21(a). At this time, since the extreme end of the tilting member 530 passes through so as to stroke the nut 103d or the threaded end of the eye bolt 103c along with the nut 103d, the eye bolt 103c is tilted automatically together with the nut 103d.

Since the tightening and untightening tool 502 is tilted in a direction indicated by an arrow 523 due to its own weight, the tightening and untightening tool 502 is deviated from an interference region when the tire 102 provided on the form 101 moves, and the contact between the tightening and untightening tool 502 and the tire 102 can be avoided.

In the aforementioned embodiments, the case where the tightening and untightening tool body 527 is tilted about an axis parallel with the center axis of the form 101 has been described as an example, it is to be noted that the tilting mechanism 529 as described above is provided on the bolt automatic tightening and untightening apparatus configured so as to withdraw linearly and upwardly with respect to the center axis of the form 101 and further withdraw laterally to achieve the automatic tilting function of the eye bolt 103c, as in the tightening and untightening device of the aforementioned bolt automatic tightening and untightening apparatuses.

That is, the apparatus provided with the tightening and untightening device according to the present embodiment has the effects as in the case of the apparatuses of the aforementioned embodiments. In addition, the bolt member in the untighted state is automatically tilted by making use of the mechanical operation of the apparatus to contribute to labor saving in the operation of tightening and untightening the threaded members.

We claim:

1. A method utilizing a bolt automatic tightening or untightening apparatus for automatically tightening or untightening bolts provided along an axial direction of a divisible cylindrical form having annular rotary supports which project from an outer peripheral surface of the cylindrical form, said bolts being spaced from said annular rotary supports by a predetermined distance, said method comprising the steps of:

conveying said cylindrical form having bolts provided thereon to a stationary frame, said stationary frame having a bolt tightening or untightening apparatus body movably supported thereon, and at least one bolt tightening and untightening device and an engaging means being mounted on said apparatus body;

detecting a passage of said annular rotary support on said cylindrical form as said cylindrical form is conveyed through said stationary frame;

driving said engaging means to contact said cylindrical form, said engaging means having a roller means which rolls along the axial direction of said cylindrical form as said cylindrical form is conveyed and contacts one of said annular rotary supports of said cylindrical form, such that said cylindrical form and said apparatus body are conveyed together relative to said stationary frame;

driving said bolt tightening and untightening device mounted on said apparatus body to said cylindrical form having bolts provided along said axial direction thereof and operatively engaging said bolt tightening and untightening device to said bolts, thereby tightening or untightening said bolts as said apparatus body and said cylindrical form move together;

driving said bolt tightening and untightening device mounted on said apparatus body out of operative engagement with said bolts and away from said cylindrical form after said bolts are tightened or untightened; and moving said engaging means away from contact with said cylindrical form and annular rotary support.

2. A method utilizing a bolt automatic tightening or untightening apparatus for automatically tightening or untightening bolts provided along an axial direction of a divisible cylindrical form having annular rotary supports which project from an outer peripheral surface of the cylindrical form, said bolts being spaced from said annular rotary supports by a predetermined distance, said method comprising the steps of:

conveying said cylindrical form to a stationary frame, said stationary frame having a bolt tightening or untightening apparatus body movably supported thereon, and at least one bolt tightening and untightening device and an engaging means being mounted on said apparatus body;

driving said engaging means to contact said cylindrical form, said engaging means having a roller means which rolls along the axial direction of said cylindrical form as said cylindrical form is conveyed and contacts one of said annular rotary supports of said cylindrical form, such that said cylindrical form and said apparatus body are conveyed together relative to said stationary frame;

driving said bolt tightening and untightening device mounted on said apparatus body to said cylindrical form having bolts provided along said axial direction thereof and operatively engaging said bolt tightening and untightening device to said bolts, thereby tightening or untightening said bolts as said apparatus body and said cylindrical form move together;

driving said bolt tightening and untightening device mounted on said apparatus body out of operative engagement with said bolts and away from said cylindrical form after said bolts are tightened or untightened; and moving said engaging means away from contact with said cylindrical form and annular rotary support;

wherein a driving amount of said engaging means during said step of driving said engaging means to contact said cylindrical form is adaptable to permit said engaging means to engage a plurality of said annular rotary supports with different outside diameters according to the kind of cylindrical form.

3. A method utilizing a bolt automatic tightening or untightening apparatus for automatically tightening or untightening bolts provided along an axial direction of a divisible cylindrical form having annular rotary supports which project from an outer peripheral surface of the cylindrical form, said bolts being spaced from said annular rotary supports by a predetermined distance, said method comprising the steps of:

conveying said cylindrical form to a stationary frame comprising a lifter frame movably supported on said stationary frame, said stationary frame having a bolt tightening or untightening apparatus body movably supported thereon, and at least one bolt tightening and untightening device and an engaging means being mounted on said apparatus body;

measuring a first distance from said lifter frame to a predetermined location on said cylindrical form;

measuring a second distance from said bolt tightening and untightening device to a bolt provided along said axial direction of said cylindrical form;

measuring a third distance from said engaging means to one of said annular rotary supports of said cylindrical form;

driving said engaging means to contact said cylindrical form based on said first, second and third measured distances, said engaging means having a roller means which rolls along the axial direction of said cylindrical form as said cylindrical form is conveyed and contacts said annular rotary support of said cylindrical form, such that said cylindrical form and said apparatus body are conveyed together relative to said stationary frame;

driving said bolt tightening and untightening device mounted on said apparatus body based on said first, second and third measured distances to said cylindrical form having bolts provided along said axial direction thereof and operatively engaging said bolt tightening and untightening device to said bolts, thereby tightening or untightening said bolts as said apparatus body and said cylindrical form move together;

driving said bolt tightening and untightening device mounted on said apparatus body out of operative engagement with said bolts and away from said cylindrical form after said bolts are tightened or untightened; and moving said engaging means away from contact with said cylindrical form and annular rotary support.

* * * * *